United States Patent
Nonaka et al.

(10) Patent No.: US 8,308,566 B2
(45) Date of Patent: Nov. 13, 2012

(54) GAME APPARATUS AND STORAGE MEDIUM HAVING GAME PROGRAM STORED THEREON

(75) Inventors: Toyokazu Nonaka, Kyoto (JP); Nobuo Matsumiya, Kyoto (JP); Yuki Hatakeyama, Yokohama (JP)

(73) Assignee: Nintendo Co., Ltd., Kyoto (JP)

( * ) Notice: Subject to any disclaimer, the term of this patent is extended or adjusted under 35 U.S.C. 154(b) by 810 days.

(21) Appl. No.: 12/370,170

(22) Filed: Feb. 12, 2009

(65) Prior Publication Data

US 2010/0144447 A1    Jun. 10, 2010

(30) Foreign Application Priority Data

Dec. 8, 2008 (JP) ................................ 2008-312535

(51) Int. Cl.
*A63F 13/00* (2006.01)
*A63F 9/24* (2006.01)
*G06F 17/00* (2006.01)
*G06F 19/00* (2011.01)

(52) U.S. Cl. .......................................... 463/37; 463/43

(58) Field of Classification Search .................... 463/37, 463/43
See application file for complete search history.

(56) References Cited

U.S. PATENT DOCUMENTS
2010/0323783 A1* 12/2010 Nonaka et al. .................. 463/23

FOREIGN PATENT DOCUMENTS
JP    2007-295990    11/2007

* cited by examiner

*Primary Examiner* — Thien F Tran
(74) *Attorney, Agent, or Firm* — Nixon & Vanderhye P.C.

(57) ABSTRACT

A game apparatus capable of performing a game process in accordance with a motion applied to an input device. The game apparatus includes motion direction identifying means, moving direction setting means, correction means, and movement control means. The motion direction identifying means identifies a motion direction of the input device. The moving direction setting means sets a moving direction of a player object in a virtual game world in accordance with the motion direction of the input device. The correction means corrects the moving direction set by the moving direction setting means in accordance with a positional relation between the player object and a target object, which is other than the player object, in the virtual game world. The movement control means causes the player object to move in the virtual game world in accordance with the set moving direction.

32 Claims, 16 Drawing Sheets a : b = Ro : Rt

GAME APPARATUS AND STORAGE MEDIUM HAVING GAME PROGRAM STORED THEREON

CROSS REFERENCE TO RELATED APPLICATION

The disclosure of Japanese Patent Application No. 2008-312535, filed Dec. 8, 2008, is incorporated herein by reference.

BACKGROUND AND SUMMARY

The technology presented herein relates to a game apparatus and a storage medium having stored thereon a game program, and more particularly relates to a game apparatus and a storage medium having stored thereon a game program which are capable of performing a game process based on a motion applied to an input device.

For example, in Japanese Laid-Open Patent Publication No. 2007-295990 (hereinafter referred to as patent document 1), disclosed is a technique of calculating a motion direction of an input device such as a controller in accordance with acceleration data outputted by an acceleration sensor mounted in the input device. A motion direction calculation device disclosed in the above-described patent document 1 identifies a direction in which the input device is being swung by using transition in acceleration data obtained during a predetermined period of time.

In the case of an operation performed by swinging the input device, even if motion of the input operation can be recognized highly accurately, it is difficult for a user to swing the input device in an appropriate direction. For example, suppose a case where an operation is performed to cause a predetermined object in a virtual world to move in accordance with a direction in which the input device is swung. In this case, it is very difficult to operate the input device accurately enough to cause the object to move to a specified position in the virtual world. That is, the operation performed by swinging the input device is not necessarily adaptable to an accurate operation.

Therefore, a feature of an example embodiment presented herein is to provide a game apparatus and a storage medium having stored thereon a game program which are capable of appropriately setting a moving direction in a virtual game world, in which the moving direction is set in accordance with an operation of moving an input device.

To attain the above the present embodiment has the following features. The reference numerals, step numbers and the like in the parentheses indicate the correspondence with the embodiment described below in order to aid in understanding the present embodiment, and are not intended to limit, in any way, the scope of the present embodiment.

A first aspect is a game apparatus (5) performing a game process in accordance with a motion applied to an input device (7). The game apparatus includes motion direction identifying means (CPU 10 executing step 41 to step 47, hereinafter denoted by step numbers only), moving direction setting means (S48 to S50), correction means (S52), and movement control means (S53). The motion direction identifying means identifies a motion direction (difference vector) of the input device. The moving direction setting means sets a moving direction (movement vector) of a player object (OBJ) in a virtual game world in accordance with the motion direction of the input device. The correction means corrects the moving direction set by the moving direction setting means in accordance with a positional relation between the player object and a target object (TG), which is other than the player object, in the virtual game world. The movement control means causes the player object to move in the virtual game world in accordance with the moving direction.

In a second aspect, the correction means corrects the moving direction set by the moving direction setting means such that the moving direction becomes closer to a direction which extends from the player object toward the target object in the virtual game world.

In a third aspect, guiding destination range setting means (Df4) is further included. The guiding destination range setting means sets a guiding destination range (Rt), which is larger in size than the target object and is set with respect to the target object, in the virtual game world. The correction means corrects the moving direction set by the moving direction setting means such that the player object in the virtual game world passes through a guiding destination range of the target object.

In a fourth aspect, the correction means compares the moving direction set by the moving direction setting means with a direction in which the player object in the virtual game world moves toward the target object, and corrects the moving direction in the case where both of the directions are closer to each other than a predetermined reference.

In a fifth aspect, guiding source range setting means (Df3) is further included. The guiding source range setting means sets a guiding source range (Ro), which is set with respect to the target object and is larger in size than the target object, in the virtual game world. The correction means corrects the moving direction set by the moving direction setting means in the case where the moving direction extends from the player object and passes within the guiding source range.

In sixth aspect, guiding source range setting means is further included. The guiding source range setting means sets a guiding source range, which is set with respect to the target object and is larger in size than the guiding destination range, in the virtual game world. In the case where the moving direction set by the moving direction setting means extends from the player object and passes within the guiding source range, the correction means corrects the moving direction such that the player object passes within the guiding destination range of the target object which defines the guiding source range.

In a seventh aspect, the correction means corrects the moving direction set by the moving direction setting means such that the moving direction becomes closer to a direction which extends from the player object toward the target object, in accordance with a ratio of a magnitude of the guiding destination range to a magnitude of the guiding source range (Ro:Rt).

In an eighth aspect, the guiding destination range setting means sets, as the guiding destination range, a predetermined range that is along a vertical line (L), which is perpendicular to a line connecting between the player object and the target object and runs through the target object, and that is centered on the target object. The guiding source range setting means sets, as the guiding source range, a range that is along the vertical line and that is larger than the guiding destination range centered on the target object. In the case where the moving direction, which extends from the player object, intersects with the guiding source range, the correction means corrects the moving direction so as to intersect with the guiding destination range of the target object which defines the guiding source range (FIGS. 10A and 10B).

In a ninth aspect, the guiding destination range setting means sets, as the guiding destination range, a circle which is centered on the target object and has a predetermined radius.

The guiding source range setting means sets, as the guiding source range, a circle which is centered on the target object and has a radius larger than that of the guiding destination range. In the case where the moving direction, which extends from the player object, passes within the guiding source range, the correction means corrects the moving direction such that the moving direction is tangent to a circle (C1) that has a radius smaller than the radius of the guiding destination range of the target object which defines the guiding source range and that is centered on the target object (FIGS. 16A and 16B).

In a tenth aspect, the guiding destination range setting means gradually reduces a magnitude of the guiding destination range with time.

In an eleventh aspect, display control means (S54) and priority setting means (Df1) are further included. The display control means allocates the player object and a plurality of the target objects in the virtual game world, and displays at least a part of the virtual game world on display means (2). The priority setting means sets a priority of correction in advance with respect to the target objects. In the case where there are a plurality of the target objects in a display screen displayed by the display means, the correction means compares directions in which the player object in the virtual game world moves toward the target objects with the moving direction set by the moving direction setting means in order of the priority set with respect to the target objects, and corrects the moving direction by using one of the target objects whose direction is first found to be closer to the moving direction than the predetermined reference.

In a twelfth aspect, display control means is further included. The display control means allocates the player object and the target object in the virtual game world, and displays at least a part of the virtual game world on display means. The guiding source range setting means changes a magnitude of the guiding source range in accordance with a position of the target object displayed on the display means.

In a thirteenth aspect, skill calculation means is further included. The skill calculation means calculates an operation ability of a player operating the player object, in accordance with an amount of correction made by the correction means so as to cause the moving direction set by the moving direction setting means to be closer to a direction which extends from the player object toward the target object.

In a fourteenth aspect, the input device includes an acceleration sensor (701). The motion direction identifying means identifies the motion direction of the input device by using acceleration indicated by acceleration data (Da) outputted from the acceleration sensor.

In a fifteenth aspect, the motion direction identifying means includes gravity direction identifying means (S43, S44) and motion calculation means (S45). The gravity direction identifying means identifies a direction of acceleration as a direction of gravity applied to the input device, in the case where a change in the acceleration indicated by the acceleration data shows that a magnitude of the acceleration is kept equivalent to a magnitude of gravity acceleration (1 G) for a predetermined period of time. The motion calculation means identifies the motion direction of the input device in accordance with the acceleration (difference vector) which is calculated by eliminating an acceleration component in the direction of gravity from the acceleration indicated by the acceleration data.

In a sixteenth aspect, the motion direction identifying means performs a process for identifying a subsequent motion direction of the input device after a predetermined period of time passes from a time point at which the motion direction of the input device has been identified (S41).

A seventeenth aspect is directed to a computer-readable storage medium having stored thereon a game program executed on a computer (10) of a game apparatus performing a game process in accordance with a motion applied to an input device. The game program causes the computer to function as motion direction identifying means, moving direction setting means, correction means, and movement control means. The motion direction identifying means identifies a motion direction of the input device. The moving direction setting means sets a moving direction of a player object in a virtual game world in accordance with the motion direction of the input device. The correction means corrects the moving direction set by the moving direction setting means in accordance with a positional relation between the player object and a target object, which is other than the player object, in the virtual game world. The movement control means causes the player object to move in the virtual game world in accordance with the moving direction.

In an eighteenth aspect, the correction means corrects the moving direction set by the moving direction setting means such that the moving direction becomes closer to a direction which extends from the player object toward the target object in the virtual game world.

In nineteenth aspect, the computer is further caused to function as guiding destination range setting means. The guiding destination range setting means sets a guiding destination range, which is larger in size than the target object and is set with respect to the target object, in the virtual game world. The correction means corrects the moving direction set by the moving direction setting means such that the player object in the virtual game world passes through a guiding destination range of the target object.

In a twentieth aspect, the correction means compares the moving direction set by the moving direction setting means with a direction in which the player object in the virtual game world moves toward the target object, and corrects the moving direction in the case where both of the directions are closer to each other than a predetermined reference.

In a twenty-first aspect, the computer is further caused to function as guiding source range setting means. The guiding source range setting means sets a guiding source range, which is set with respect to the target object and is larger in size than the target object, in the virtual game world. The correction means corrects the moving direction set by the moving direction setting means in the case where the moving direction extends from the player object and passes within the guiding source range.

In a twenty-second aspect, the computer is further caused to function as guiding source range setting means. The guiding source range setting means sets a guiding source range, which is set with respect to the target object and is larger in size than the guiding destination range, in the virtual game world. In the case where the moving direction set by the moving direction setting means extends from the player object and passes within the guiding source range, the correction means corrects the moving direction such that the player object passes within the guiding destination range of the target object which defines the guiding source range.

In a twenty-third aspect, the correction means corrects the moving direction set by the moving direction setting means such that the moving direction becomes closer to a direction which extends from the player object toward the target object, in accordance with a ratio of a magnitude of the guiding destination range to a magnitude of the guiding source range.

In a twenty-fourth aspect, the guiding destination range setting means sets, as the guiding destination range, a predetermined range that is along a vertical line, which is perpendicular to a line connecting between the player object and the target object and runs through the target object, and that is centered on the target object. The guiding source range setting means sets, as the guiding source range, a range that is along the vertical line and that is larger than the guiding destination range centered on the target object. In the case where the moving direction, which extends from the player object, intersects with the guiding source range, the correction means corrects the moving direction so as to intersect with the guiding destination range of the target object which defines the guiding source range.

In a twenty-fifth aspect, the guiding destination range setting means sets, as the guiding destination range, a circle which is centered on the target object and has a predetermined radius. The guiding source range setting means sets, as the guiding source range, a circle which is centered on the target object and has a radius larger than that of the guiding destination range. In the case where the moving direction, which extends from the player object, passes within the guiding source range, the correction means corrects the moving direction such that the moving direction is tangent to a circle that has a radius smaller than the radius of the guiding destination range of the target object which defines the guiding source range and that is centered on the target object.

In a twenty-sixth aspect, the computer is further caused to function as display control means and priority setting means. The display control means allocates the player object and a plurality of the target objects in the virtual game world, and displays at least a part of the virtual game world on display means. The priority setting means sets a priority of correction in advance with respect to the target objects. In the case where there are a plurality of the target objects in a display screen displayed by the display means, the correction means compares directions in which the player object in the virtual game world moves toward the target objects with the moving direction set by the moving direction setting means in order of the priority set with respect to the target objects, and corrects the moving direction by using one of the target objects whose direction is first found to be closer to the moving direction than the predetermined reference.

In a twenty-seventh aspect, the guiding destination range setting means gradually reduces a magnitude of the guiding destination range with time.

In a twenty-eighth aspect based on the twenty-first aspect, the computer is further caused to function as display control means. The display control means allocates the player object and the target object in the virtual game world, and displays at least a part of the virtual game world on display means. The guiding source range setting means changes a magnitude of the guiding source range in accordance with a position of the target object displayed on the display means.

In a twenty-ninth aspect, the computer is further caused to function as skill calculation means. The skill calculation means calculates an operation ability of a player operating the player object, in accordance with an amount of correction made by the correction means so as to cause the moving direction set by the moving direction setting means to be closer to a direction which extends from the player object toward the target object.

In a thirtieth aspect, the input device includes an acceleration sensor. The motion direction identifying means identifies the motion direction of the input device by using acceleration indicated by acceleration data outputted from the acceleration sensor.

In a thirty-first aspect, the motion direction identifying means includes gravity direction identifying means and motion calculation means. The gravity direction identifying means identifies a direction of acceleration as a direction of gravity applied to the input device, in the case where a change in the acceleration indicated by the acceleration data shows that a magnitude of the acceleration is kept equivalent to a magnitude of gravity acceleration for a predetermined period of time. The motion calculation means identifies the motion direction of the input device in accordance with the acceleration which is calculated by eliminating an acceleration component in the direction of gravity from the acceleration indicated by the acceleration data.

In a thirty-second aspect, the motion direction identifying means performs a process for identifying a subsequent motion direction of the input device after a predetermined period of time passes from a time point at which the motion direction of the input device has been identified.

According to the first aspect, in a game in which a player object is caused to move in accordance with a motion of an input device, it is possible to appropriately set a moving direction of the player object in accordance with the positional relation between the player object and the target object.

According to the second aspect, the moving direction of the player object is corrected such that the player object, which is caused to move in accordance with the motion of the input device, comes closer to the target object. For example, when a player wishes to cause the player object to hit a target object in the virtual game world, the hit can be realized even if a direction in which the player object moves toward the target object is not completely identical with a direction in which the input device moves. That is, when the player moves the input device in a direction closer, to some extent, to a direction which extends from the player object toward the target object, an operation desired by the player can be achieved and an accurate operation is not required.

According to the third aspect, the game is not set such that the player object definitely hits the target object when the player moves the input device. That is, when the game is set such that the player object definitely hits the target object when the player moves the input device, the game becomes boring and uninteresting. However, since a guiding destination range is set in an area surrounding the target object, it is possible to prevent such a problem.

According to the fourth aspect, even when the player moves the input device, the moving direction is not necessarily corrected with respect to the target object. That is, the player needs to aim at the target object to some extent in order to hit the target object, whereby the amusingness of the game can be maintained.

According to the fifth aspect, a guiding source range is set in an area surrounding the target object, whereby the amusingness of the game can be maintained easily.

According to the sixth aspect, when a direction which extends from the player object toward the target object is extremely different from a direction in which the input device moves, the moving direction is not to be corrected. Further, even if the moving direction is to be corrected, in the case where a direction which extends from the player object toward the target object is far different from a direction in which the input device moves, the player object is adjusted so as not to hit the target object. That is, the player needs to move the input device so as to aim at the target object, to some extent, so as to be hit by the player object. Specifically, by adjusting a magnitude of the guiding source range, a possibility that the moving direction is to be corrected is also adjusted. Further, when a magnitude of the guiding destination range is adjusted, it is possible to adjust a degree of correction of the moving direction so as to be closer to the direction which extends from the player object toward the target object.

According to the seventh aspect, the magnitudes of the guiding source range and the guiding destination range of the target object are adjusted, whereby it is possible to adjust a ratio to cause the moving direction to be closer to a direction extending from the player object toward the target object. In other words, when a ratio of the magnitude of the guiding destination range to that of the guiding source range is adjusted, it is possible to adjust a difficulty level of a game.

According to the eighth or the ninth aspect, the guiding source range and the guiding destination range of the target object are defined with lines or circles, whereby it is possible to easily perform a process of correcting the moving direction.

According to the tenth aspect, priority of correction is set with respect to the respective target objects, and thus it is possible to set such that the player object is easily guided toward some target objects, and the player object cannot be guided easily toward other target objects.

According to the eleventh aspect, it is possible to set a game such that the player object hardly hits the target object when the game is started, and the player object comes to hit the target object easily with time.

According to the twelfth aspect, in the case where a target object performs a scroll movement with respect to the player object, for example, it is possible to adjust the player object so as to be easily guided toward the target object when the target object is in a position not to be hit easily by the player object (e.g., in an upper or a lower side of the player object)

According to the thirteenth aspect, it is possible to determine a game skill of a player by using a result of the process of correcting the moving direction.

According to the fourteenth aspect, it is possible to identify the motion of the input device by using the acceleration applied to the input device.

According to the fifteenth aspect, it is possible to identify the motion of the input device by using the acceleration from which the gravity direction applied to the input device has been subtracted.

When the input device is swung, there is a case where the acceleration in an opposite direction is applied during a series of swinging motions. Accordingly, if all the component of the acceleration including that in the opposite direction is used for determination, it is difficult to determine the direction in which the input device is being swung. According to the sixteenth aspect, acceleration which occurs during a predetermined period of time after the moving direction of the input device is identified is excluded from next motion determination, and accordingly, it is possible to prevent the acceleration in the direction opposite to the acceleration used in the most recent motion determination from being used for the next motion determination.

With a storage medium having stored thereon a game program of the present embodiment, it is possible to attain the same effects as in the case of the above-described game apparatus.

These and other features, aspects and advantages of the present embodiment will become more apparent from the following detailed description of the present invention embodiment when taken in conjunction with the accompanying drawings.

DESCRIPTION OF THE PREFERRED EMBODIMENTS

Figure 1:
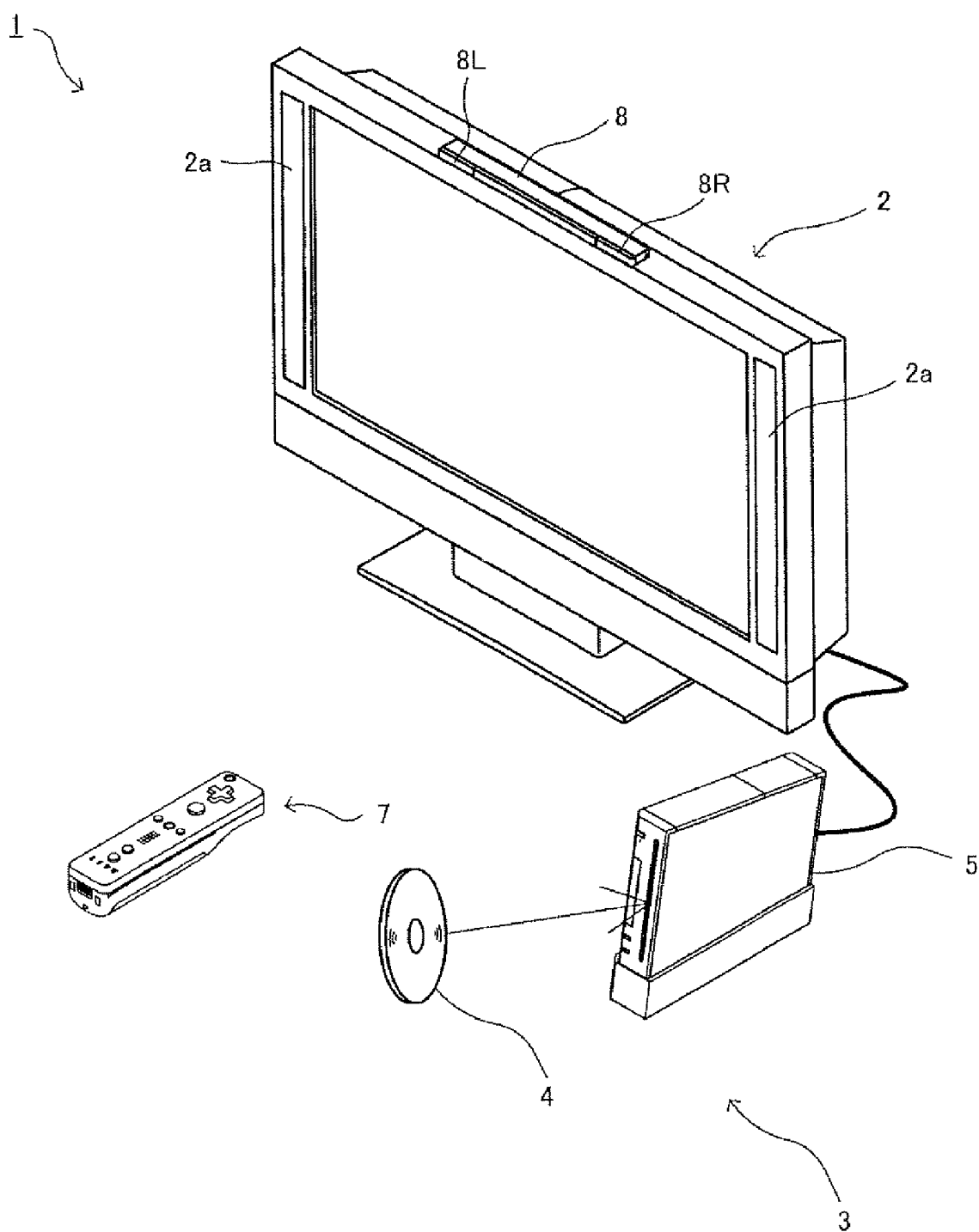
FIG. 1 is an outer appearance illustrating a game system 1 according to one embodiment.
Figure 2:
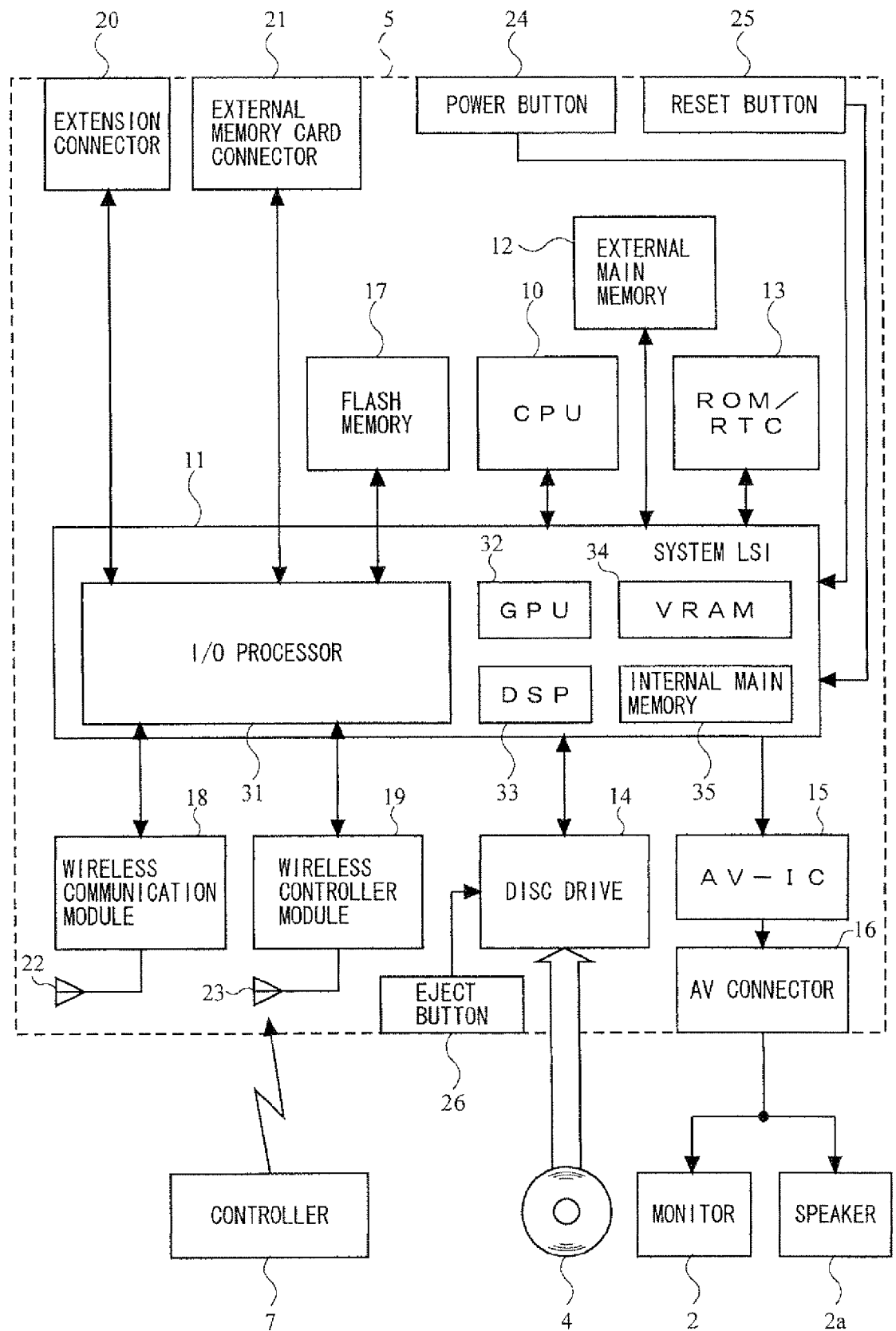
FIG. 2 is a functional block diagram of a game apparatus body 5 shown in FIG. 1.

With reference to FIG. 1, a game apparatus for executing a game program according to one embodiment will be described. Hereinafter, for the same of specific explanation, a game system including a stationary game apparatus body 5 will be described as an example. FIG. 1 is an outer appearance of a game system 1 including a stationary game apparatus 3. FIG. 2 is a block diagram of the game apparatus body 5. Hereinafter, the game system 1 will be described.

As shown in FIG. 1, the game system 1 includes a home television receiver (hereinafter referred to as a monitor) 2, which is exemplary display means, and a stationary game apparatus 3 which is connected to the monitor 2 via a connection cord. The monitor 2 includes speakers 2a for outputting sound based on an audio signal outputted from the game apparatus 3. Further, the game apparatus 3 includes an optical disc 4 having stored thereon a game program, which is an exemplary game program of the present invention, the game apparatus body 5 including a computer for executing the game program stored on the optical disc 4 so as to output and display a game screen on the monitor 2, and a controller 7 for providing the game apparatus body 5 with operational information necessary for the game to operate a character or the like displayed on the game screen.

The game apparatus body 5 incorporates therein a wireless controller module 19 (see FIG. 2). The wireless controller module 19 receives data wirelessly transmitted from the controller 7, and also transmits data from the game apparatus body 5 to the controller 7, thereby connecting the controller 7 and the game apparatus body 5 via wireless communication. Further, the optical disc 4, which is an exemplary information storage medium exchangeably used to the game apparatus body 5, is detachably inserted into the game apparatus body 5.

The game apparatus body 5 also incorporates therein a flash memory 17 (see FIG. 2) which functions as a backup memory for fixedly storing data such as save data. When game program or the like stored on the optical disc 4 is executed, the game apparatus body 5 displays a result of the execution as a game image on the monitor 2. Further, the game program or the like is not necessarily stored on the optical disc 4, but may be stored in advance in the flash memory 17 and executed. Still further, the game apparatus body 5 uses save data stored in the flash memory 17 so as to reproduce a state of a game played in the past, thereby displaying an image of the game on the monitor 2. A player playing with the game apparatus 3 can enjoy the game by operating the controller 7 while watching the image of the game displayed on the monitor 2.

The controller 7 uses a technology of Bluetooth (registered trademark), for example, and wirelessly transmits transmission data such as operation information to the game apparatus body 5 incorporating therein the wireless controller module 19. The controller 7 is operating means for mainly controlling a player object or the like displayed on a display screen of the monitor 2. The controller 7 has a housing which is small enough to be held by one hand, and a plurality of operation buttons (including a cross key, a stick, and the like) exposed at a surface of the housing. As described later in detail, the controller 7 includes an imaging information calculation section 74 for taking an image as viewed from the controller 7. As exemplary imaging targets of the imaging information calculation section 74, two LED modules 8L and 8R (hereinafter referred to as markers 8L and 8R) are provided in the vicinity of the display screen of the monitor 2. The markers 8L and 8R, for example, output infrared light forward from the monitor 2, respectively. Further, in the controller 7, the communication section 75 receives transmission data wirelessly transmitted from the wireless controller module 19 of the game apparatus body 5, whereby sound or vibration based on the transmission data is generated.

Next, with reference to FIG. 2, an internal configuration of the game apparatus body 5 will be described. FIG. 2 is a block diagram showing a configuration of the game apparatus body 5. The game apparatus body 5 has a CPU (Central Processing Unit) 10, a system LSI (Large Scale Integration) 11, an external main memory 12, an ROM/RTC (Read Only Memory/ Real Time Clock) 13, a disc drive 14, an AV-IC (Audio Video- Integrated Circuit) 15, and the like.

The CPU 10 performs a game process by executing a game program stored on the optical disc 4, and acts as a game processor. The CPU 10 is connected to the system LSI 11. In addition to the CPU 10, the external main memory 12, the ROM/RTC 13, the disc drive 14, and the AV-IC 15 are connected to the system LSI 11. The system LSI 11 performs processes such as control of data transmission among component parts connected to the system LSI 11, generation of an image to be displayed, and acquisition of data from external devices. An internal configuration of the system LSI 11 will be described later. The external main memory 12, which is a volatile memory, stores therein such a program as a game program loaded from the optical disc 4 or a game program loaded from the flash memory 17, and various data. The external main memory 12 is used as a work area or a buffer area of the CPU 10. The ROM/RTC 13 has a ROM (so called a boot ROM) incorporating a program for booting up the game apparatus body 5, and a clock circuit (RTC) for counting time. The disc drive 34 reads program data, texture data, and the like from the optical disc 4, and writes the read data into an internal main memory 35 to be described later or the external main memory 12.

Further, provided to the system LSI 11 are an input/output processor 31, a GPU (Graphics Processor Unit) 32, a DSP (Digital Signal Processor) 33, a VRAM (Video RAM) 34, and the internal main memory 35. Although not shown in drawings, these component parts 31 to 35 are connected to one another via an internal bus.

The GPU 32 functions as a part of drawing means, and generates an image in accordance with a graphics command (draw command) from the CPU 10. The VRAM 34 stores therein data (such as polygon data and texture data) necessary for the GPU 32 to execute the graphics command. When an image is to be generated, the GPU 32 uses data stored in the VRAM 34 and generates image data.

The DSP 33 functions as an audio processor, and generates audio data by using sound data and sound waveform (tone quality) data stored in the internal main memory 35 or the external main memory 12.

The image data and the audio data generated as above described are read by the AV-IC 15. The AV-IC 15 outputs the read image data to the monitor 2 via the AV connector 16, and also outputs the read audio data to the speakers 2a provided on the monitor 2. Accordingly, the image is displayed on the monitor 2, and the sound is outputted from the speakers 2a.

The input/output (I/O) processor 31 executes transmission of data among component parts connected to the I/O processor 31, and also executes downloading of data from external devices. The I/O processor 31 is connected to the flash memory 17, the wireless communication module 18, the wireless controller module 19, an expansion connector 20, and an external memory card connector 21. An antenna 22 is connected to the wireless communication module 18, and an antenna 23 is connected to the wireless controller module 19.

The I/O processor 31 is connected to a network via the wireless communication module 18 and the antenna 22, and is capable of communicating with another game apparatus and various servers connected to the network. The I/O processor 31 accesses the flash memory 17 on a regular basis so as to detect data, if any, which is necessary to be transmitted to the network. If the data is detected, the detected data is transmitted to the network via the wireless communication module 18 and the antenna 22. The I/O processor 31 receives data transmitted from another game apparatus and data downloaded from a download server, via the network, the antenna 22, and the wireless communication module 18, and stores the received data in the flash memory 17. The CPU 10 executes the game program, and reads the data stored in the flash memory 17 to be used while executing the game program. In the flash memory 17, not only data transmitted between the game apparatus body 5 and another game apparatus or various servers, but also save data (result data or progress data) of a game played by using the game apparatus body 5 may be stored.

The I/O processor 31 also receives operation data and the like, which is transmitted from the controller 7 via the antenna 23 and the wireless controller module 19, and (temporarily) stores the operation data in the internal main memory 35 or in the buffer area of the external main memory 12. As with the external main memory 12, the internal main memory 35 may be used for storing the game programs read from the optical disc 4 or from the flash memory 17, and various data, and may be used as the work area or the buffer area of the CPU 10.

The expansion connector 20 and the external memory card connector 21 are connected to the I/O processor 31. The expansion connector 20 is an interface connector as typified by a USB and an SCSI, and is capable of performing communication with the network, instead of the wireless communication module 18, by connecting thereto a medium such as an external storage medium, a peripheral device such as another controller, or a wired communication connector. The external memory card connector 21 is a connector for connecting thereto the external storage medium such as a memory card. For example, the I/O processor 31 accesses the external storage medium via the expansion connector 20 and the external memory card connector 21, and then saves data or reads data.

Provided to (,for example, on the front main surface of) the game apparatus body 5 are a power button 24 for the game apparatus body 5, a reset button 25 for a game process, an insertion slot in which the optical disc 4 is inserted, an eject button 26 for causing the optical disc 4 to be ejected from the insertion slot of the game apparatus body 5, and the like. The power button 24 and the reset button 25 are connected to the system LSI 11. When the power button 24 is turned on, power is supplied to each of the component parts of the game apparatus body 5 via an AC adaptors which is not shown. When the reset button 25 is pressed, the system LSI 11 reboots the boot-up program of the game apparatus body 5. The eject button 26 is connected to the disc drive 14. When the eject button 26 is pressed, the optical disc 4 is ejected from the disc drive 14.

Figure 3:
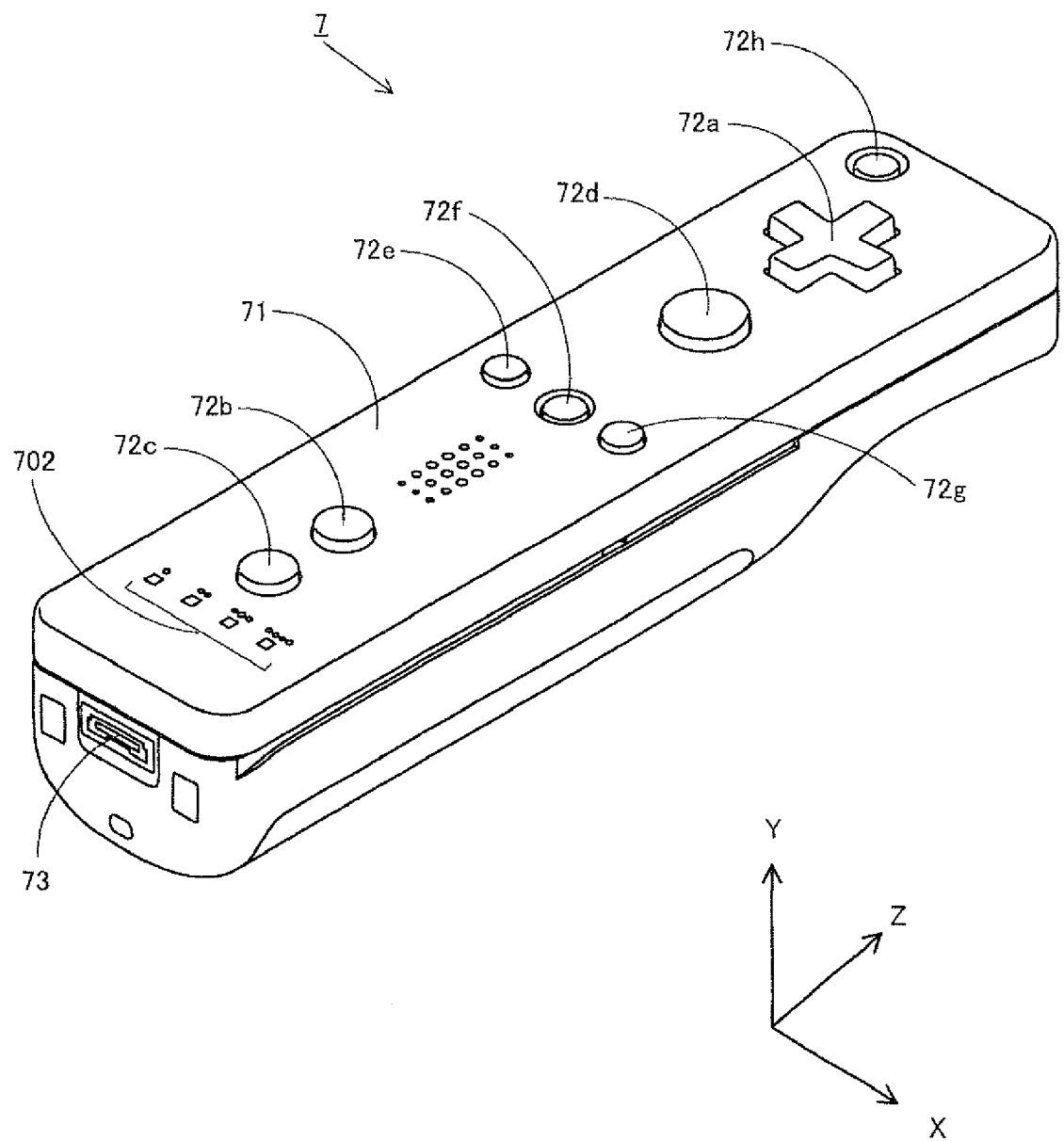
FIG. 3 is a perspective view of a controller 7 as viewed from a top rear side thereof shown in FIG. 1.
Figure 4:
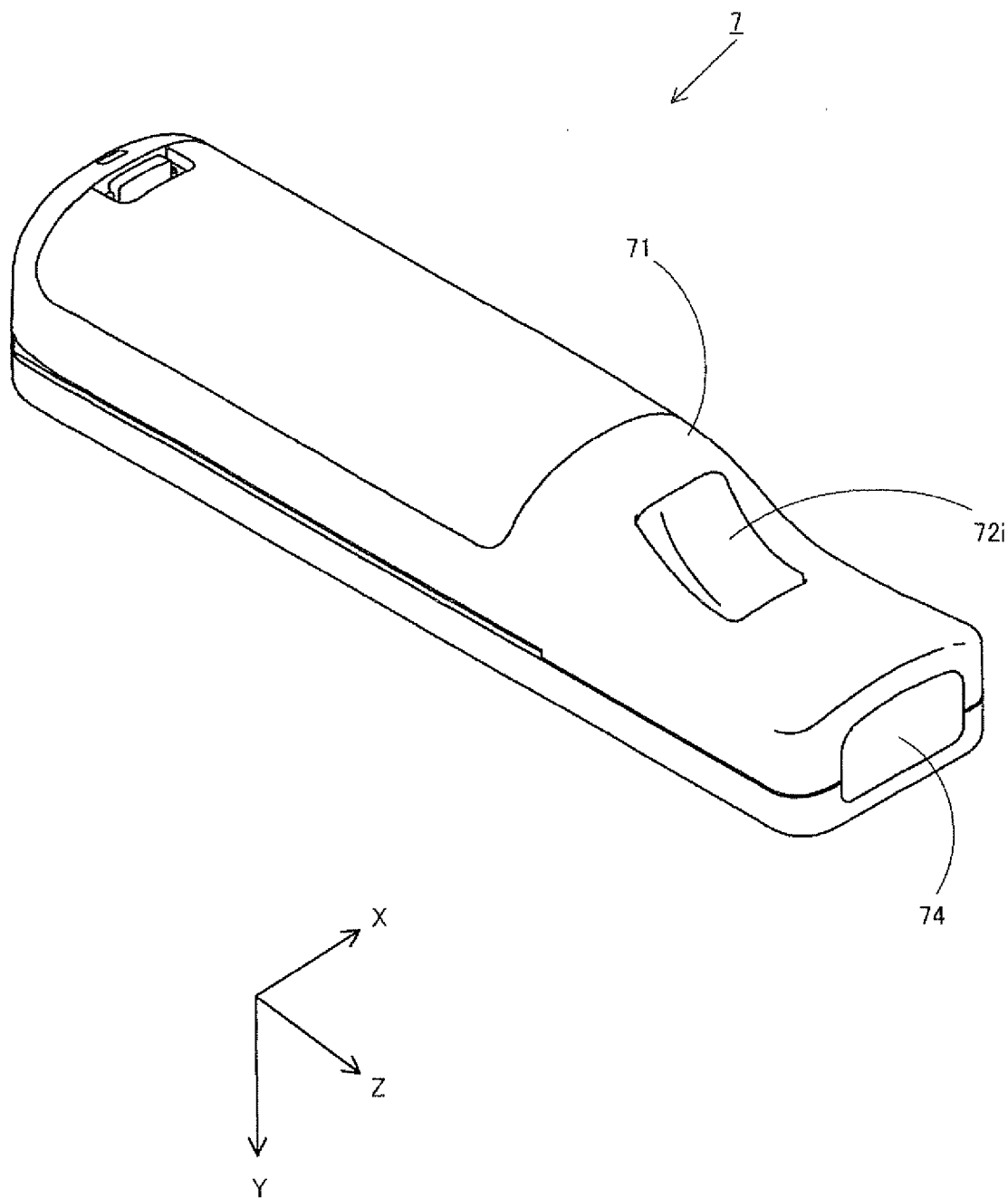
FIG. 4 is a perspective view of the controller 7 as viewed from a bottom front side thereof shown in FIG. 3.

With reference to FIGS. 3 and 4, the controller 7 will be described. FIG. 3 is a perspective view of the controller 7 as viewed from a top rear side thereof. FIG. 4 is a perspective view of the controller 7 as viewed from a bottom front side thereof.

As shown in FIGS. 3 and 4, the controller 7 includes a housing 71 which is formed by plastic molding, for example, and a plurality of operation sections 72 are provided on the housing 71. The housing 71 has a substantially parallelepiped shape extending in a longitudinal direction from front to rear, and an overall size thereof is small enough to be held by one hand of an adult or even of a child.

At a front center portion of a top surface of the housing 71, a cross key 72a is provided. The cross key 72a is a cross-shaped four direction push switch, and operation portions thereof are respectively located on cross-shaped projecting portions arranged at intervals of 90 degrees such that the operation portions correspond to four directions (front, rear, right, and left). A player selects one of the front, rear, right, and left directions by pressing one of the operation portions of the cross key 72a. Through an operation of the cross key 72a, the player can indicate a direction in which a player character or the like appearing in a virtual game world is to move, or select an instruction from a plurality of choices.

The cross key 72a is an operation section for outputting an operation signal in accordance with the direction input operation performed by the player as above described, and the operation section may be provide in another form. For example, the operation section may be provided such that four push switches are arranged in the cross directions and an operation signal is outputted by the player's pressing one of the four push switches. Further, in addition to the four push switches, a center switch may be provided at a crossing portion of the above-described cross directions so as to provide an operation section composed of the four push switches and a center switch. Alternatively, the cross key 72a may be replaced with an operation section which includes an inclinable stick (so called a joystick) projecting from the top surface of the housing 71 and which outputs the operation signal in accordance with an inclining direction of the stick. Still alternatively, the cross key 72a may be replaced with an operation section which includes a disc-shaped member horizontally slidable and outputs an operation signal in accordance with an sliding direction of the disc-shaped member. Still alternatively, the cross key 72a may be replaced with a touchpad.

Behind the cross key 72a on the top surface of the housing 71, a plurality of operation buttons 72b to 72g are provided. The operation buttons 72b to 72g are each an operation section for outputting an operation signal assigned thereto when the player presses a head thereof. For example, functions such as a No. 1 button, a No. 2 button, and an A button and the like are assigned to the operation buttons 72b to 72d. Further, functions such as a minus button, a home button, a plus button and the like are assigned to the operation buttons 72e to 72g. Various operation functions are assigned to these operation buttons 72a to 72g in accordance with the game program executed by the game apparatus body 5. In an exemplary arrangement shown in FIG. 3, the operation buttons 72b to 72d are arranged in a line at the center in a front-rear direction on the top surface of the housing 71. Further, the operation buttons 72e to 72g are arranged in a fine on the top surface of the housing 71 in a left-right direction between the operation buttons 72b and 72d. The operation button 72f has a top surface thereof buried in the top surface of the housing 71 to reduce the possibility of inadvertent pressing by the player.

In front of the cross key 72a on the top surface of the housing 71, an operation button 72h is provided. The operation button 72h is a power switch for turning on and off the power to the game apparatus body 5 by remote control. The operation button 72h also has a top surface thereof buried in the top surface of the housing 71 to reduce the possibility of inadvertent pressing by the player.

Behind the operation button 72c on the top surface of the housing 71, a plurality of LEDs 702 is provided. A controller type (number) is assigned to the controller 7 so as to be distinguishable from another controller 7. For example, the LEDs 702 may be used to provide a player a visual indication of the controller type assigned to the controller 7. Specifically, a signal is transmitted, from the wireless controller module 19 to the controller 7, so as to light a LED corresponding to the above-described controller type among the plurality of LEDs 702.

On the top surface of the housing 71, speaker holes for emitting sound from a speaker (a speaker 706 shown in FIG. 5), which is to be described later, are formed between the operation button 72b and the operation buttons 72e to 72g.

On a bottom surface of the housing 71, a recessed portion is formed. The recessed portion on the bottom surface of the housing 71 is formed in a position in which an index finger or middle finger of the player is located when the player holds the controller with one hand and points a front portion thereof to the markers 8L and 8R. On a slope surface of the recessed portion, an operation button 72i is provided. The operation button 72i is an operation section acting as, for example, a B button.

On a front surface of the housing 71, an image pickup element 743 constituting a part of an imaging information calculation section 74 is provided. The imaging information calculation section 74 is a system which analyzes image data picked up by the controller 7, identifies a high brightness area in the image, and detects the center of gravity and a size or the like of the area. For example, the imaging information calculation section 74 has a maximum sampling period of about 200 frames/sec., and thus can trace and analyze even a relatively fast motion of the controller 7. A configuration of the imaging information calculation section 74 will be described later in detail. On a rear surface of the housing 71, a connector 73 is provided. The connector 73 is, for example, an edge connector, and is used for coupling and connecting the controller with a connection cable.

For the sake of detail explanation, a coordinate system set for the controller 7 will be defined. As shown in FIGS. 3 and 4, an X-axis, a Y-axis, and a Z-axis which are perpendicular to one another are defined with respect to the controller 7. Specifically, a longer direction, which is the front-rear direction, of the housing 71 is defined as the Z-axis, and a direction toward the front surface (a surface on which the imaging information calculation section 74 is provided) of the controller 7 is defined as a Z-axis positive direction. An up-down direction of the controller 7 is defined as the Y-axis, and a direction toward the top surface (a surface on which the operation button 72a is provided) of the housing 71 is defined as a Y-axis positive direction. Further, the left-right direction of the controller 7 is defined as the X-axis direction, and a direction toward the right side surface (a side surface shown in FIG. 3) of the housing 71 is defined as an X-axis positive direction.

Figure 5:
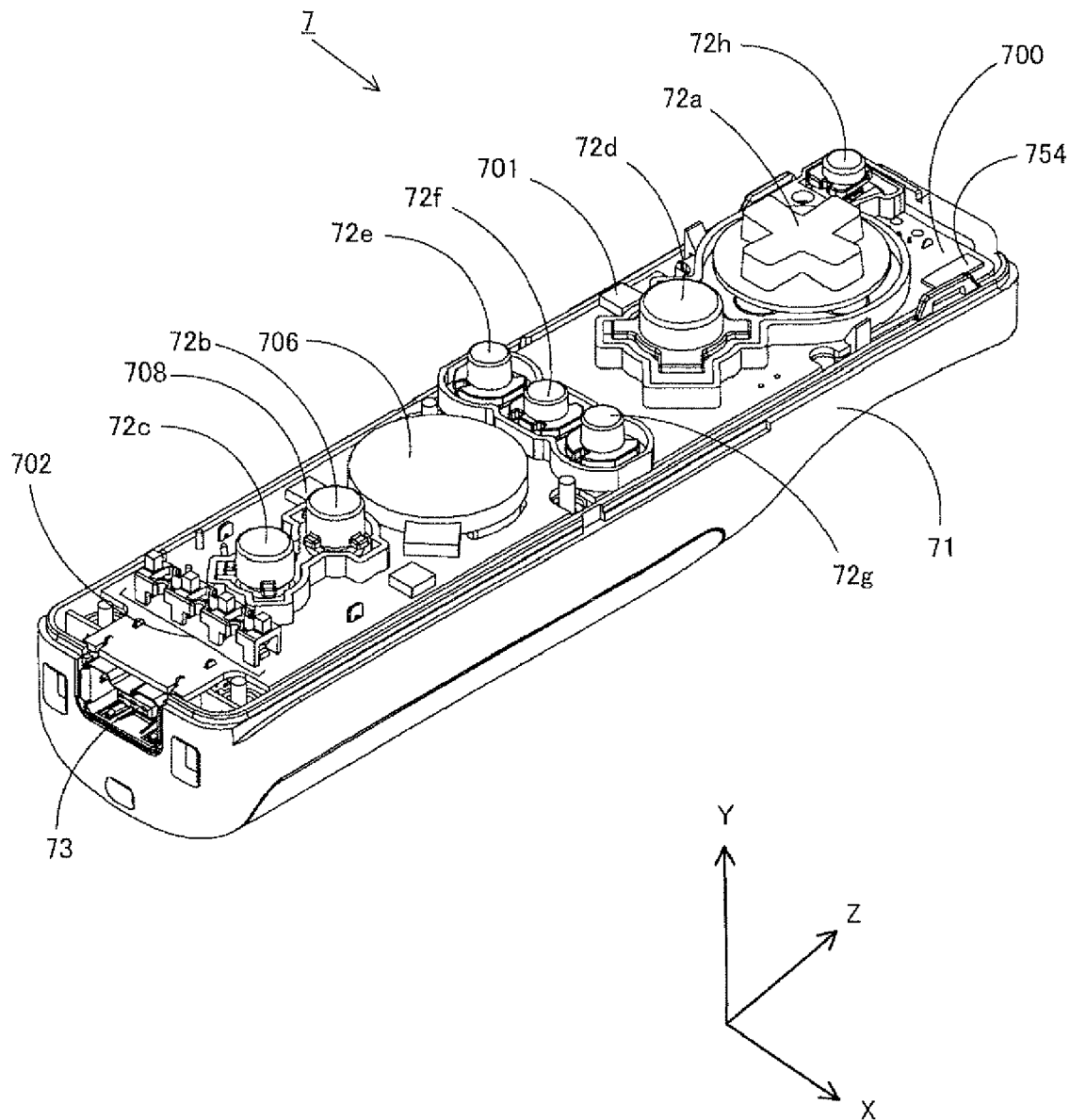
FIG. 5 is a perspective view of the controller 7 shown in FIG. 3 in a state where an upper housing thereof is removed.
Figure 6:
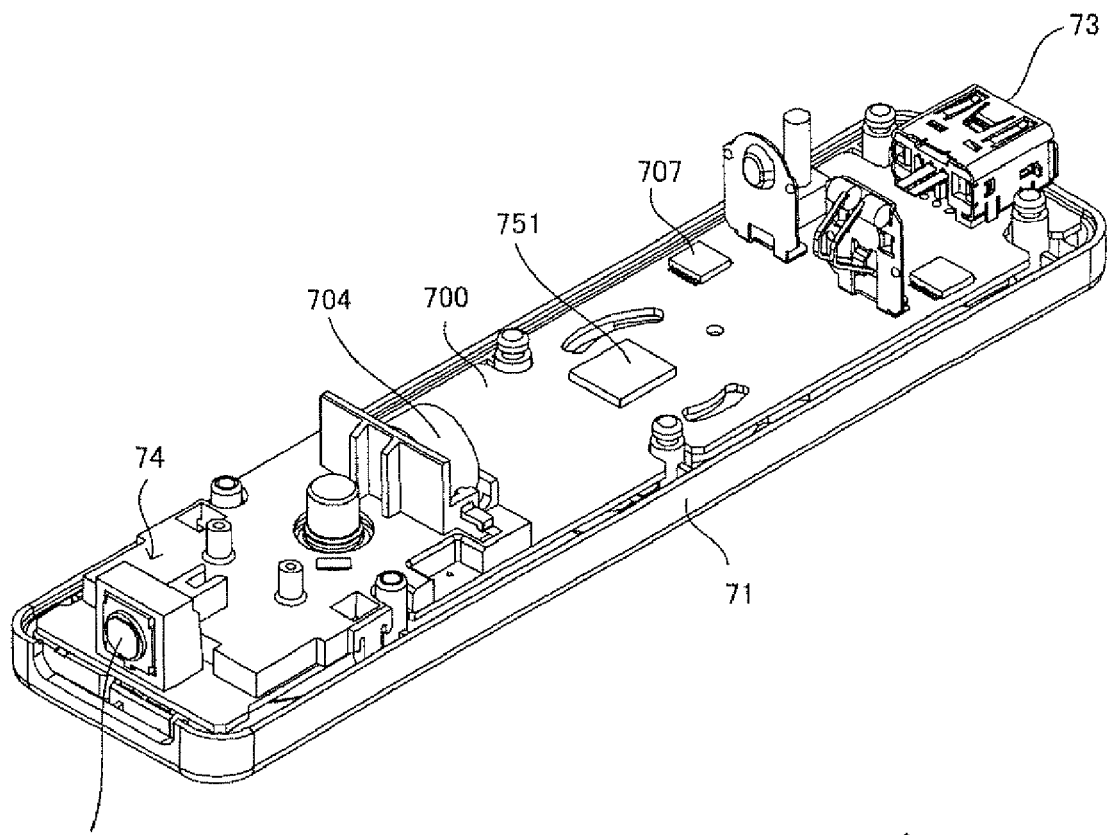
FIG. 6 is a perspective view of the controller 7 shown in FIG. 4 in a state where a lower housing thereof is removed.

Next, with reference to FIGS. 5 and 6, an internal structure of the controller 7 will be described. FIG. 5 is a perspective view illustrating the controller 7, as viewed from the top rear surface thereof, in a state where an upper casing (a part of the housing 71) thereof is removed. FIG. 6 is a perspective view illustrating the controller 7, as viewed from the front side thereof, in a state where a lower casing (a part of the housing 71) thereof is removed. FIG. 6 shows a perspective view illustrating a reverse side of a substrate 700 shown in FIG. 5.

As shown in FIG. 5, the substrate 700 is fixed inside the housing 71. On a top main surface of the substrate 700, the operation buttons 72a to 72h, an acceleration sensor 701, the LEDs 702, an antenna 754, and the like are provided. These elements are connected to a microcomputer 751 (see FIGS. 6 and 7) and the like via lines (not shown) formed on the substrate 700 and the like. The wireless module 753 (see FIG. 7) and the antenna 754 allow the controller 7 to act as a wireless controller. A quartz oscillator (not shown) is provided inside the housing 71, and generates a reference clock of the microcomputer 751 to be described later. On a top main surface of the substrate 700, the speaker 706 and an amplifier 708 are provided. Further, the acceleration sensor 701 is provided on the substrate 700 to the left of the operation button 72d (that is, not at the center portion of the substrate 700 but near the periphery of the substrate 700). Accordingly, in addition to a directional change of gravity acceleration, the acceleration sensor 701 is capable of detecting acceleration including an acceleration component exerted by a centrifugal force in accordance with the controller 7 rotating about the longer direction thereof. Therefore, the game apparatus body 5 or the like is capable of determining, through a predetermined calculation, a motion of the controller 7 sufficiently accurately in accordance with the detected acceleration data.

As shown in FIG. 6, at a front edge of a bottom main surface of the substrate 700, the imaging information calculation section 74 is provided. The imaging information calculation section 74 includes an infrared filer 741, a lens 742, the image pickup element 743, and an image processing circuit 744, located in this order from the front surface of the controller 7 on the bottom surface of the substrate 700. To a rear edge of the bottom main surface of the substrate 700, the connector 73 is attached. Further, on the bottom main surface of the substrate 700, a sound IC 707 and the microcomputer 751 are provided. The sound IC 707, which is connected to the microcomputer 751 and the amplifier 708 via the line formed on the substrate 700 and the like, outputs an audio signal to the speaker 706 via the amplifier 708 in a accordance with the sound data transmitted from the game apparatus body 5.

On the bottom main surface of the substrate 700, a vibrator 704 is attached. The vibrator 704 may be, for example, a vibration motor or a solenoid. The vibrator 704 is connected to the microcomputer 751 via the line formed on the substrate 700 and the like, and is powered on/off in accordance with vibration data transmitted from the game apparatus body 5. The controller 7 is vibrated by an actuation of the vibrator 704, and the vibration is conveyed to the player's hand holding the controller 7. Thus, a so-called vibration-responsive game may be realized. The vibrator 704 is provided near the front part of the housing 71, and therefore, a large vibration of the housing 71 allows the player holding the controller 7 to easily feel the vibration.

Figure 7:
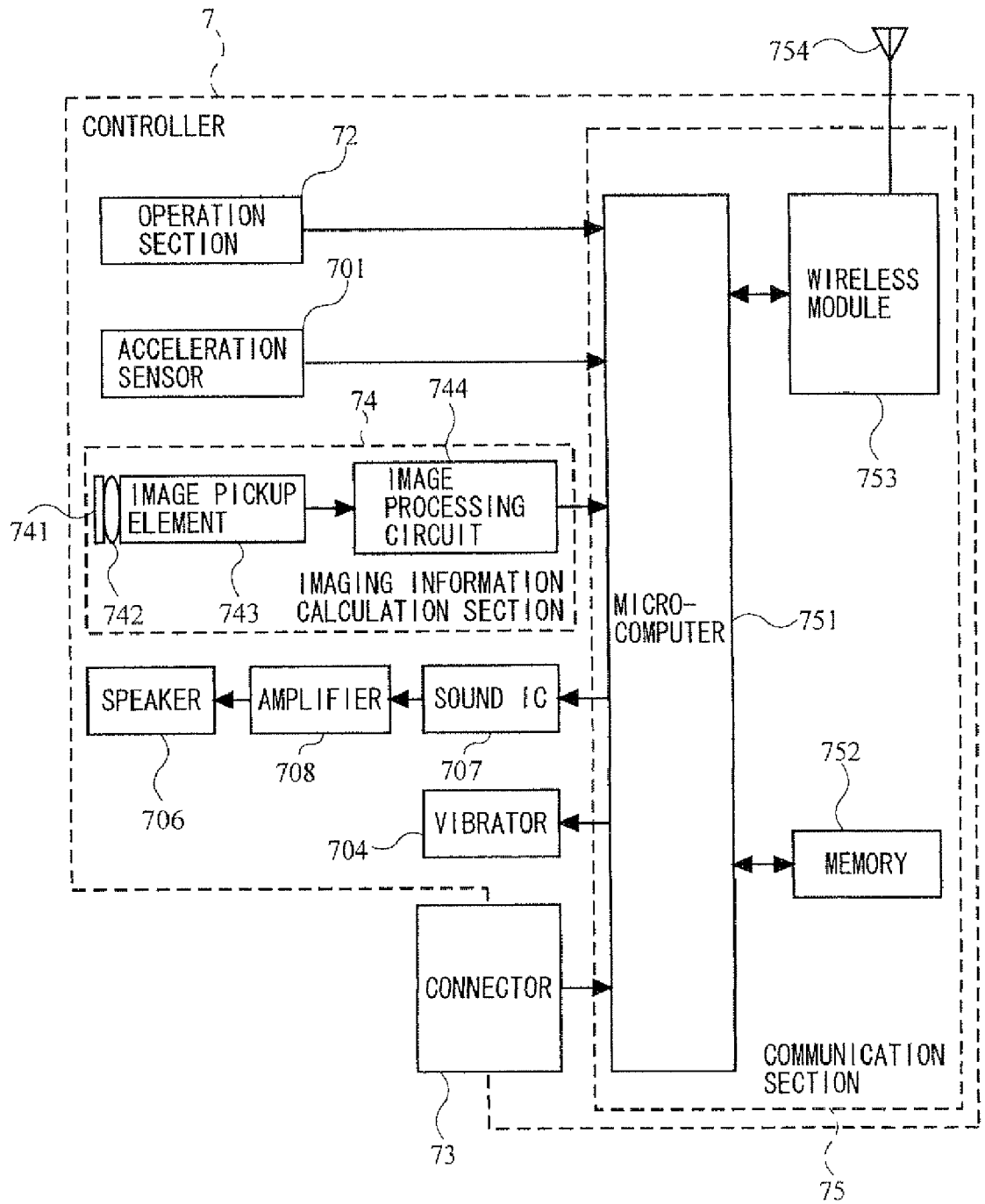
FIG. 7 is a block diagram showing a configuration of the controller 7 shown in FIG. 3.

Next, with reference to FIG. 7, an internal configuration of the controller 7 will be described. FIG. 7 is a block diagram illustrating a configuration of the controller 7.

As shown in FIG. 7, the controller 7 includes the communication section 75, in addition to the operation section 72, the imaging information calculation section 74, the acceleration sensor 701, the vibrator 704, the speaker 706, the sound IC 707, and the amplifier 708 as described above.

The imaging information calculation section 74 includes the infrared filer 741, the lens 742, the image pickup element 743, and the image processing circuit 744. The infrared filer 741 allows only infrared light to pass therethrough, among light incident on the front surface of the controller 7. The lens 742 converges the infrared light passed through the infrared filer 741 and outputs the infrared light to the image pickup element 743. The image pickup element 743 is a solid-state image pickup element such as a CMOS sensor or a CCD. The image pickup element 743 takes an image of the infrared light converged by the lens 742. Therefore, the image pickup element 743 takes an image of only the infrared light passed through the infrared filer 741, and generates image data. The image data generated by the image pickup element 743 is processed by the image processing circuit 744. Specifically, the image processing circuit 744 processes the image data obtained from image pickup element 743, detects a high brightness area, and outputs process result data to the communication section 75, the process result data being indicative of a coordinate point and a size of the detected area. The imaging information calculation section 74 is fixed to the housing 71 of the controller 7, and thus an imaging direction thereof can be changed by changing the direction of the housing 71.

The controller 7 preferably includes a three-axis (X-axis, Y-axis, Z-axis) acceleration sensor 701. The three-axis acceleration sensor 701 detects a linear acceleration in three directions, i.e., the up-down direction (Y-axis shown in FIG. 3), the left-right direction (X-axis shown in FIG. 3), and the front-rear direction (Z-axis shown in FIG. 3). Further, an accelerometer capable of detecting linear acceleration in at least two axis directions (e.g., X-axis and Y-axis) may be used, alternatively. For example, the acceleration sensor 701 as described above may be of the type available from Analog Devices, Inc. or STMicroelectronics N.V. Preferably, the acceleration sensor 701 is an electrostatic capacitance (capacitance-coupling) type that is based on silicon micro-machined MEMS (Micro Electro Mechanical Systems) technology. However, any other suitable technology of accelerometer (for example, piezoelectric type or piezoresistance type) now existing or to be developed later may be used to provide the acceleration sensor 701.

An accelerometer used in the acceleration sensor 701 is capable of detecting acceleration (linear acceleration) only along a straight line corresponding to each axis of the acceleration sensor 701. In other words, directly output from the acceleration sensor 701 is a signal indicative of the linear acceleration (static or dynamic) along each of the three axes. As a result, the acceleration sensor 701 cannot directly detect movement along non-linear (e.g., arcute) path, rotation, rotational movement, angular displacement, tilt, position, posture, or any other physical characteristic.

However, when a computer, such as a processor (e.g., the CPU 10) of the game apparatus or a processor (e.g., the microcomputer 751) of the controller, processes acceleration signal outputted from the acceleration sensor 701, additional information relating to the controller 7 can be inferred or calculated (determined), as one skilled in the art will readily understand from the description herein.

For example, suppose a case where the computer processes the acceleration signal outputted from the acceleration sensor 701 of the controller 7 in a static state (that is, a case where it is anticipated that acceleration detected by the acceleration sensor 701 includes gravity acceleration only). In the case where the controller 7 is actually in a static state, it is possible to determine whether or not the controller 7 tilts relative to the direction of gravity and also to determine a degree of the tilt, based on the detected acceleration. Specifically, when a detected axis of the acceleration sensor 701 is directed to a vertically-downward direction, and such a situation is set as a reference, then it is possible to determine whether or not the controller 7 tilts relative to the vertically-downward direction, based on only whether or not is (gravity acceleration) is applied in the detected axis direction. Further, based on the magnitude of the acceleration applied in the detected axis direction, it is possible to determine a degree of the tilt of the controller 7 relative to the vertically-downward direction. Further, in the case of the acceleration sensor 701 which is capable of detecting the acceleration in multi-axis directions, an acceleration signal detected along each of the axes is processed, whereby it is possible to determine the tilt of the controller 7 relative to the direction of gravity. In this case, in accordance with an output from the acceleration sensor 701, data indicative of a tilt angle of the controller 7 may be calculated by the processor. Alternatively, without calculating the data indicative of the tilt angle, an approximate degree of the tilt of the controller 7 may be inferred based on the output from the acceleration sensor 701. In this manner, it is possible to determine the tilt, the posture, or the position of the controller 7 by using the acceleration sensor 701 and the processor in a combined manner.

On the other hand, in the case where the acceleration sensor 701 is in a dynamic state, the acceleration sensor 701 detects acceleration based or a movement of the acceleration sensor 701 in addition to the gravity acceleration component. Therefore, when the gravity acceleration component is eliminated through a predetermined process, it is possible to determine, for example, a direction in which the controller 7 moves. Specifically, when the controller 7 including the acceleration sensor 701 is dynamically accelerated and moved by a hand of a player, it is possible to calculate various motions and/or positions of the controller 7 by processing the acceleration signals generated by the acceleration sensor 701. Even in the case where the acceleration sensor 701 is in a dynamic state, it is possible to determine the tilt of the controller 7 relative to the direction of gravity provided that the acceleration based on the movement of the acceleration sensor 701 is eliminated through the predetermined process.

In another embodiment, the acceleration sensor 701 may include an embedded signal processor or another type of dedicated processor for performing any desired process on the acceleration signal which is outputted from an embedded accelerometer before the signal is outputted to the microcomputer 751. For example, when the acceleration sensor 701 is designed to detect static acceleration (for example, the gravity acceleration), the embedded signal processor or the dedicated processor may convert the detected acceleration signal into a corresponding tilt angle (or another preferable parameter). Data indicative of the acceleration detected by the acceleration sensor 701 is outputted to the communication section 75.

In still another embodiment, instead of the acceleration sensor 701, a gyro sensor may be used which incorporates therein a rotation element, a vibration element, or the like. An exemplary MEMS gyro sensor used in the present embodiment may be of the type available from Analog Devices, Inc. Unlike the acceleration sensor 701, the gyro sensor is capable of directly detecting a rotation (or an angular velocity) about an axis of at least one gyroscopic component included therein. In this manner, the gyro sensor is fundamentally different from the acceleration sensor, and thus a process performed based on a signal outputted from either of the sensors need to be changed as appropriate depending on which one of the sensors is used for a particular applications.

Specifically, when the tilt and the posture are calculated by using the gyro sensor instead of the acceleration sensor, a substantial change is necessary. In other words, when the gyro sensor is used, a value of the tilt is initialized at time of starting detection. Angular velocities outputted from the gyro sensor are then integrated. Variation in tilt is calculated from the initialized value of the tilt. In this case, the tilt to be calculated corresponds to a value of an angle. On the ocher hand, in the case of calculating the tilt by using the acceleration sensor, values of the gravity acceleration components along the respective axes are compared to predetermined reference values corresponding thereto and, then the tilt is calculated. Accordingly, the calculated tilt can be represented by a vector, and thus an absolute direction can be detected by the accelerometer without performing initialization. Further, the value calculated as the tilt is represented by an angle in the case of using the gyro sensor, whereas the value is represented by a vector in the case of using the acceleration sensor. Therefore, when the gyro sensor is used instead of the acceleration sensor, the tilt data needs to be converted in an appropriate manner, while taking differences between the two sensors into account. Since characteristics of the gyroscope as well as the fundamental differences between the accelerometer and the gyroscope are well known by the one skilled in the art, further description thereof will be omitted. On the one hand, the gyro sensor has the advantage of being capable of directly detecting rotation. On the other hand, the acceleration sensor is generally a cost-effective option as compared with the gyro sensor when used for the controller of the present embodiment.

The communication section 75 includes the microcomputer 751, a memory 752, the wireless module 753, and the antenna 754. At the time of processing, the microcomputer 751 controls the wireless module 753 for wirelessly transmitting transmission data while using the memory 752 as a storage area. Further, the microcomputer 751 controls operations of the sound IC 707 and the vibrator 704 in accordance with the data received by the wireless module 753 from the game apparatus body 5 via the antenna 754. The sound IC 707 processes the sound data and the like transmitted from the game apparatus body 5 via the communication section 75. Further, the microcomputer 751 actuates the vibrator 704 in accordance with vibration data (e.g. a signal for turning the vibrator 704 "ON" or "OFF") transmitted from the game apparatus body 5 via the communication section 75.

Data from the controller 7 such as an operation signal (key data) from the operation section 72, an acceleration signal in three axis directions (acceleration data in the X-axis, Y-axis, and Z-axis directions) from the acceleration sensor 701, and process result data from the imaging information calculation section 74 are outputted to the microcomputer 751. The microcomputer 751 temporarily stones the inputted data (the key data, the acceleration data in the X-axis, Y-axis, and Z-axis directions, and the process result data) in the memory 752 as transmission data to be transmitted to the wireless controller module 19. The wireless transmission from the communication section 75 to the wireless controller module 19 is performed in predetermined time cycles. Since the game process is generally performed in a cycle of 1/60 sec., the wireless transmission needs to be performed in a cycle of a shorter time period. Specifically, the game process is performed in a cycle of 16.7 ms (1/60 sec.), and a transmission cycle of the communication section 75 composed of the Bluetooth (registered trademark) is 5 ms. At a timing of performing a wireless transmission to the wireless controller module 19, the microcomputer 751 outputs, to the wireless module 753, the transmission data stored in the memory 752 as a series of pieces of operation information. The wireless module 753 then uses the Bluetooth (registered trademark) technology so as to emit a radio signal indicative of the operation information from the antenna 754 by using a carrier wave having a predetermined frequency. In other words, data including the key data from the operation section 72, the acceleration data in the X-axis, Y-axis and Z-axis directions from the acceleration sensor 701, and the process result data from the imaging information calculation section 74 is transmitted from the controller 7. The wireless controller module 19 of the game apparatus body receives the radio signal, and the radio signal is demodulated or decoded in the game apparatus body 5, whereby a series of pieces of operation information (such as the key data, the acceleration data in the X-axis, Y-axis, and Z-axis directions, and the process result data) is obtained. The CPU 10 included in the game apparatus body 5 performs the game process based on the obtained operation information and on the game program. In the case where the communication section 75 is configured by using the Bluetooth (registered trademark) technology, the communication section 75 may have a function of receiving transmission data wirelessly transmitted from another device.

Figure 8:
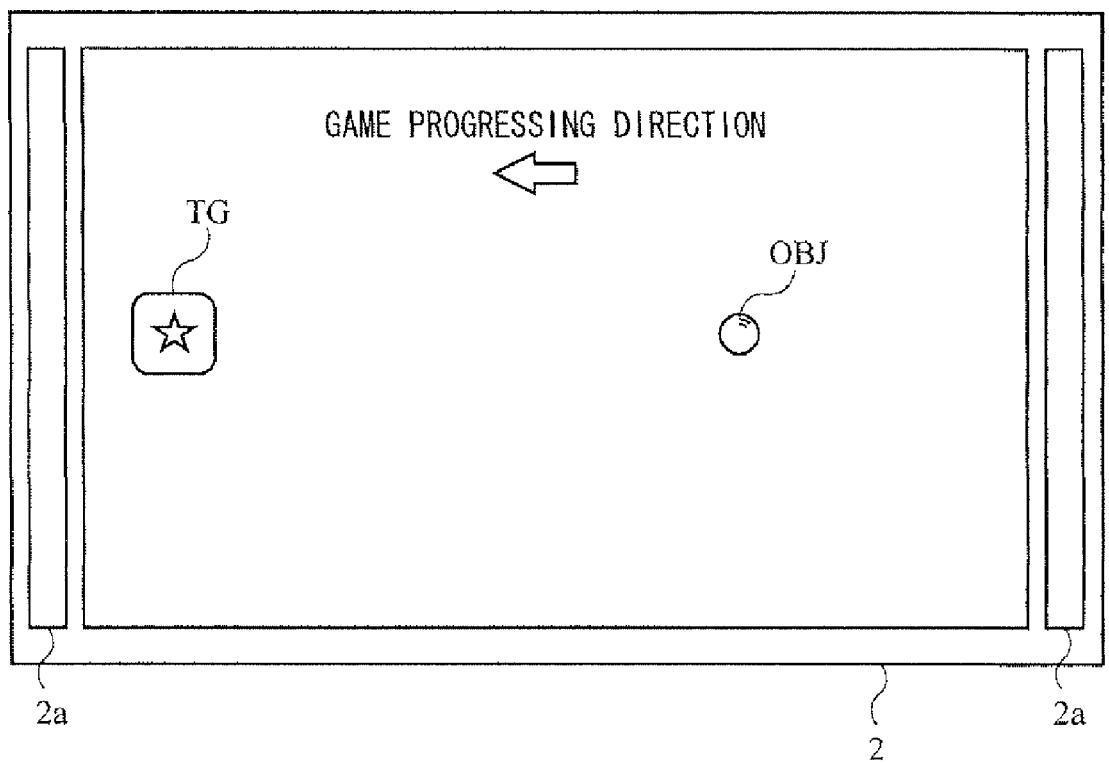
FIG. 8 is a diagram showing an exemplary game imaged displayed on a monitor 2.
Figure 9:
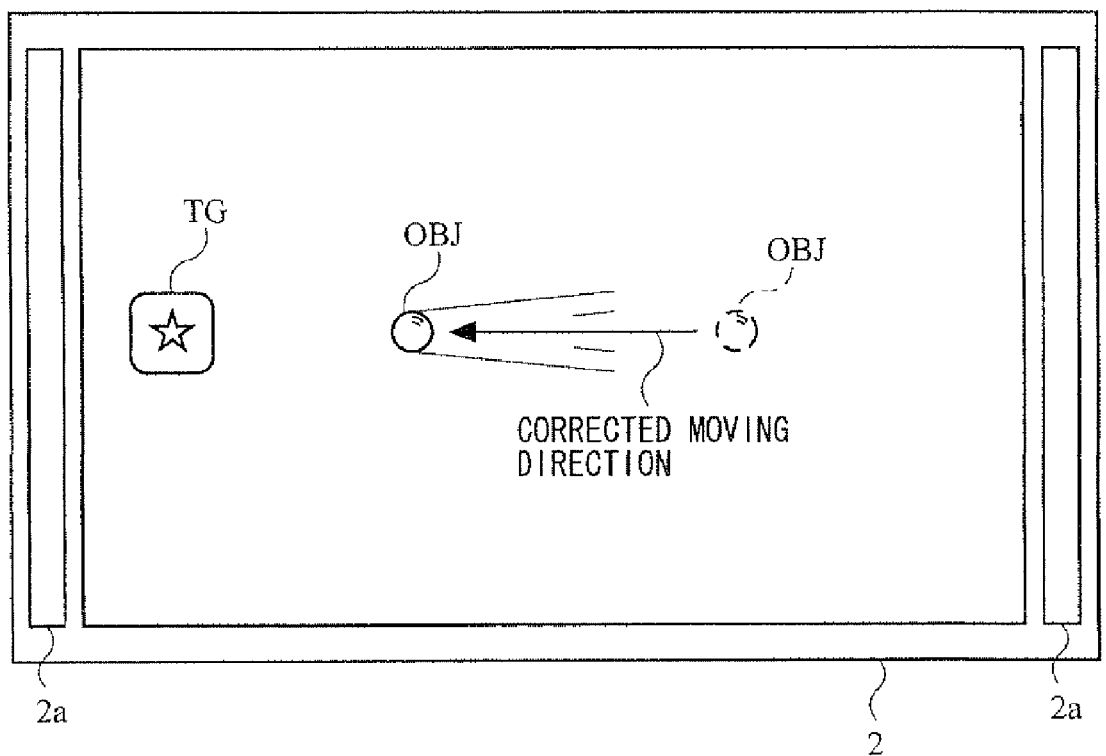
FIG. 9 is a diagram showing an example of a player object OBJ moving in accordance with a swinging motion of the controller 7 while the controller 7 is swung.
Figure 9:
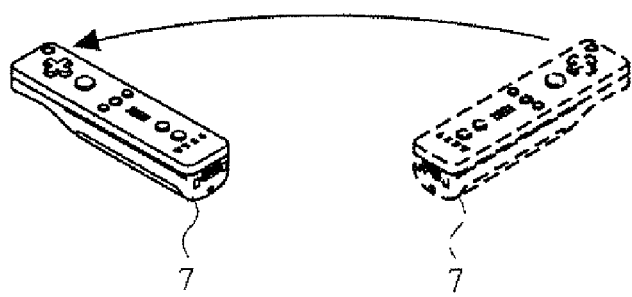
Figure 10A:
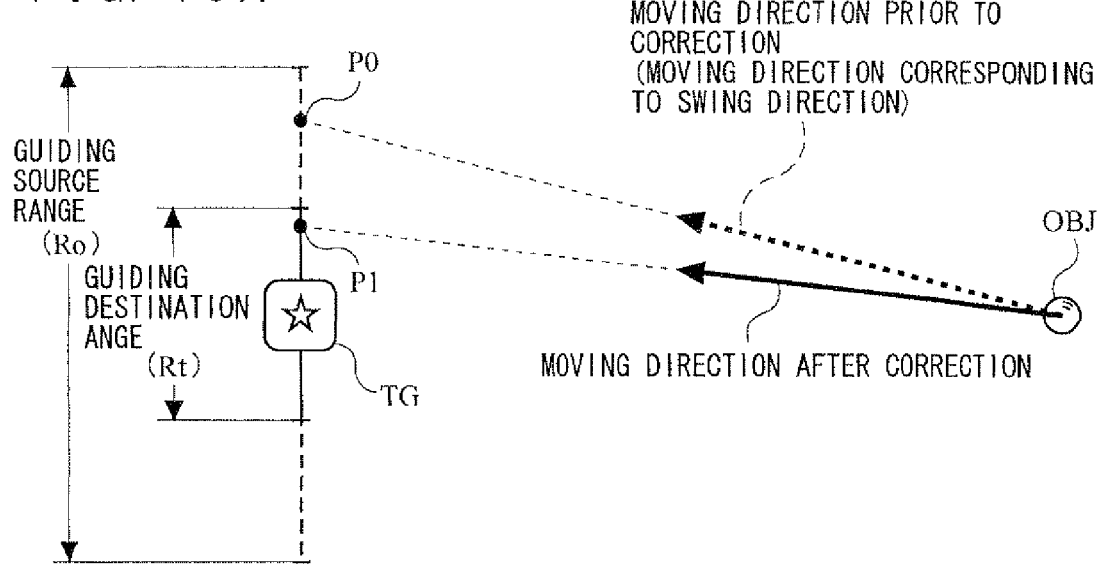
FIG. 10A is a diagram showing an exemplary case where a moving direction, which is set based on the swinging motion of the controller 7, is corrected.
Figure 10B:
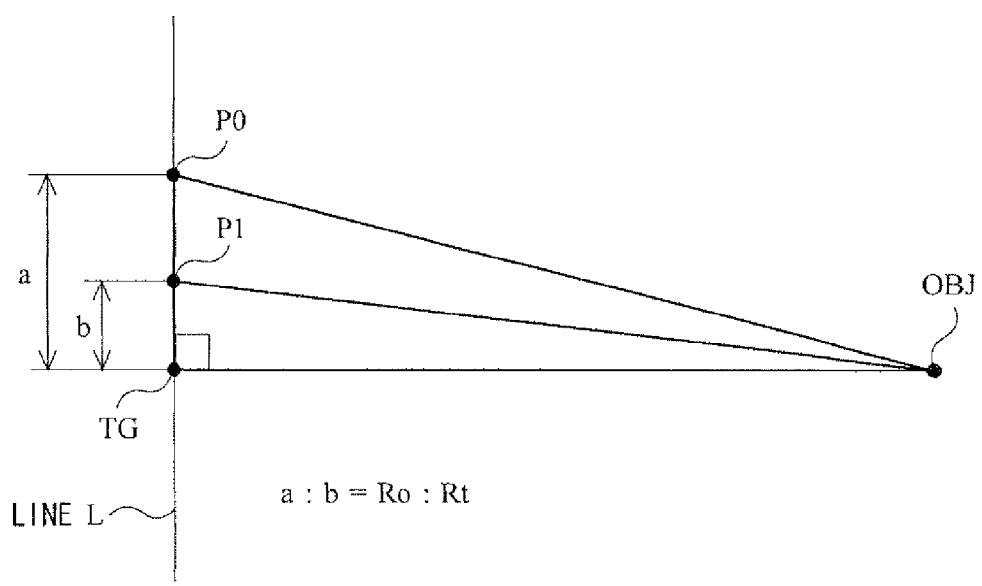
FIG. 10B is a diagram showing an exemplary case where the moving direction, which is set based on the swinging motion of the controller 7, is corrected.

Next, with reference to FIGS. 8 to 10, an outline of a game performed on the game apparatus body 5 will be described prior to describing specific processes performed by the game apparatus body 5. FIG. 8 is a diagram showing an exemplary game image displayed on the monitor 2. FIG. 9 is a diagram showing an example of a player object OBJ moving in accordance with a swinging motion of the controller 7. FIG. 10A and FIG. 10B are diagrams each showing an exemplary case where the moving direction, which is set based on the swinging motion of the controller 7, is corrected.

As shown in FIG. 8, the player object OBJ moving in a virtual game world is displayed on the monitor 2. FIG. 8 shows an exemplary game in which the player object OBJ moves in the right direction (a game progressing direction) in a two-dimensional virtual game world. For example, the virtual game world displayed on the monitor 2 is scrolled to the left at a predetermined speed, and the player object OBJ movies in the virtual game world displayed on the monitor 2. That is, the virtual camera moves to the left in the virtual game world, and the virtual game world displayed on the screen moves to the right. Accordingly, the game progresses to the left. The player causes the player object OBJ to hit a target TG appearing in the virtual game world, thereby scoring predetermined points.

In FIG. 9, the player object OBJ moves in the virtual game world in accordance with the direction in which the controller 7 is swung. In FIG. 9, in accordance with the controller 7 swung from the right to the left in a real space, the player object OBJ moves from the right to the left in a real virtual game world on the monitor 2. For example, acceleration, which is generated when the player swings the controller 7, is detected by the acceleration sensor 701, and data indicative of the acceleration is transmitted to the game apparatus body 5. In the game apparatus body 5, based on the received acceleration data, the direction in which the controller 7 has been swung is calculated, and the moving direction of the player object OBJ is set in accordance with the calculated swing direction. At the time of setting the moving direction, the moving direction of the player object OBJ is corrected in the game apparatus body 5 such that the player object OBJ can easily hit the target TG. Hereinafter, the target TG with respect to which the moving direction of the player object OBJ is to be corrected may be referred to as a correction target TG.

In FIGS. 10A and 10B, a guiding source range and a guiding destination range are set with respect to the correction target TG. The guiding source range is used to determine whether or not the moving direction of the player object OBJ, the moving direction being set in the virtual game world in accordance with the direction in which the controller 7 is swung, is to be corrected. When the set moving direction extends from a position of the player object OBJ at a current time point toward a position within the guiding source range from, the moving direction is to be corrected so as to be closer to the correction target TG which defines the guiding source range. For example, the guiding source range is set to have a range length Ro such that the range length Ro is parallel with a direction (straight line L) which is perpendicular to a direction extending from the player object OBJ toward the correction target TG, and that the correction target TG corresponds to the center of the range length Ro.

The guiding destination range is used to set a degree of correction based on which the moving direction of the player object OBJ is corrected to be closer to the correction target TG. For example, the moving direction to-be-corrected is corrected so to be closer to the correction target TG in accordance with a ratio of guiding destination range to guiding source range.

Specifically, the guiding destination range is set to have a range length Rt (Rt<Ro) such that the range length Rt is parallel with the direction (straight line L) which is perpendicular to the direction extending from the player object OBJ toward the correction target TG, and that the correction target TG corresponds to the center of the range length Rt. In this case, the moving direction to-be-corrected is corrected so as to be closer to the correction target TG at a rate of Rt/Ro. Specifically, an intersection between the moving direction prior to correction and the straight line L is represented by a point P0, and a distance from the point P0 to the center of the correction target TG is represented by a distance a (a<Ro/2). In this case, in accordance with the distance a, a point P1 is set, which is located along the straight line L and distanced on the side of the point P0 from the center of the correction target TG by a distance b. The distance b is calculated based on an equation, b=a*Rt/Ro. The moving direction prior to correction from the position of the player object OBJ at the current time point toward the point P0 is then corrected to a direction from the position of the player object OBJ at the current time point toward the point P1.

As is clear from the above-described example of correcting the moving direction, a size of the guiding destination range (range length Rt) is set larger than that of the correction target TG. As a result, the moving direction after correction does not necessarily intersect with the correction target TG, and consequently, there is a possibility that the player object OBJ does not hit the correction target TG. That is, when the moving direction runs within the guiding source range, the moving direction is corrected so as to be closer to the correction target TG. However, the player object OBJ hits the correction target TG only in the case where the moving direction is close enough to the correction target TG. Therefore, even if the correction is performed, the correction target TG is not necessarily hit, and thus it is possible to prevent the game from being artificially too easy. The guiding source range is used to determine whether or not the moving direction is to be corrected. Therefore, it is possible to adjust a difficulty level of various games by changing the size of the guiding destination range (range length Rt) and/or the size of the guiding source range (range length Ro). When the difficulty level is to be lowered, a width of the guiding destination range is set to be equal to that of the correction target TG. Accordingly, as long as the moving direction is directed toward the guiding source range, the player object OBJ will definitely hit the correction target TG after the correction is performed.

Figure 11:
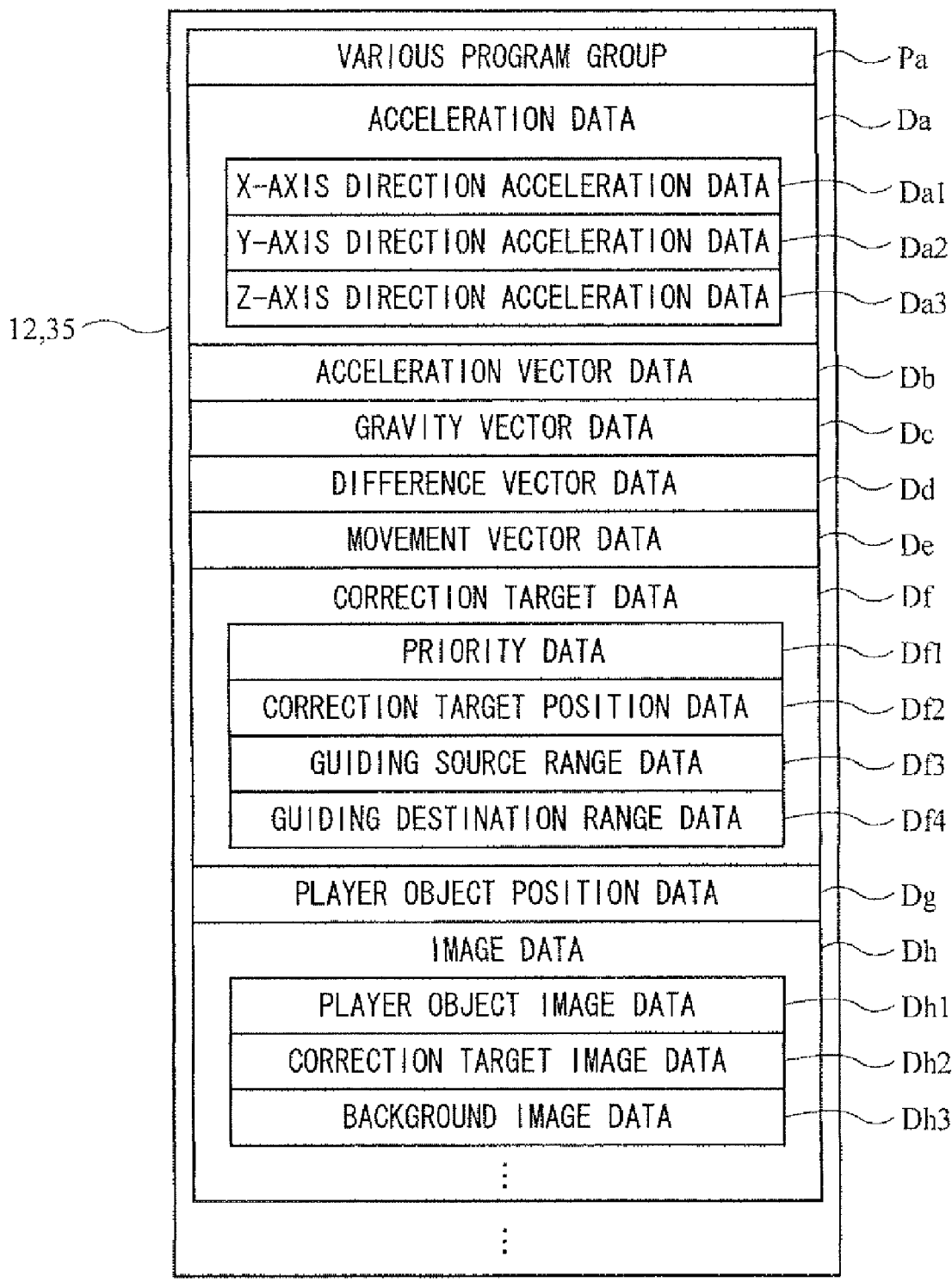
FIG. 11 is a diagram showing main pieces of data and programs stored in a main memory of a game apparatus body 5.

Next, the game process performed on the game system 1 will be described in detail. With reference to FIG. 11, major data used in the game process will be described. FIG. 11 is a diagram showing major data and programs stored in the external main memory 12 and/or the internal main memory 35 (hereinafter collectively referred to as main memory) of the game apparatus body 5.

As shown in FIG. 11, data storage area of the main memory stores therein acceleration data Da, acceleration vector data Db, gravity vector data Dc, difference vector data Dd, movement vector data De, correction target data Df, player object position data Dg, image data Dh, and the like. The main memory stores therein data necessary for the game process such as data (e.g., position data) relating to other objects than the player object OBJ appearing on the game, and data relating to the virtual game world (e.g., background data), in addition to such data included in information shown in FIG. 11. Further, a program storage area of the main memory stores therein various programs Pa which configures the game program.

The acceleration data Da represents acceleration exerted on the controller 7, and stores therein acceleration data included in the series of pieces of operation information transmitted from the controller 7 as the transmission data. The acceleration data Da includes: X-axis direction acceleration data Da1, which indicates an acceleration component detected along the X-axis direction by the acceleration sensor 701; Y-axis direction acceleration data Da2, which indicates an acceleration component detected along the Y-axis direction; and Z-axis direction acceleration data Da3, which indicates an acceleration component detected along the Z-axis direction. The wireless controller module 19 provided to the game apparatus body 5 receives the acceleration data included in the operation information which is transmitted from the controller 7 in predetermined time cycles (e.g., 1/200 sec.), and stores the acceleration data in a buffer (not shown) of the wireless controller module 19. Thereafter, the acceleration data stored in the buffer is read every frame period (e.g., 1/60 sec.), which corresponds to a game process cycle, and the acceleration data Da in the main memory is updated.

Since a cycle of receiving the operation information is different from the data process cycle, a plurality pieces of the operation information received through a plurality of cycles is described in the buffer. In the game process to be described later, only a latest piece of operation information among the plurality of pieces of operation information is used in respective steps of the game process, and the steps are progressed successively.

In a process flow to be described later, an exemplary case will be used where the acceleration data Da is updated every frame period, namely, every game process cycle. However, the acceleration data Da may be updated in other process cycles. For example, the acceleration data Da is updated in every transmission cycle from the controller 7, and the updated acceleration data Da may be used in every game process cycle. In this case, the cycle of updating the acceleration data Da1 to Da3 to be stored in the acceleration data Da is different from the game process cycle.

The acceleration vector data Db is data indicative of an acceleration vector which is calculated by using acceleration indicated by the X-axis direction acceleration data Da1, the Y-axis direction acceleration data Da2, and the Z-axis direction acceleration data Da3. The acceleration vector data Db stores therein a direction and magnitude of the acceleration exerted on the controller 7. The gravity vector data Dc stores therein a gravity vector indicative of a direction and magnitude of the gravity exerted on the controller 7. The difference vector data Dd stores therein a vector (difference vector) which is obtained by subtracting the gravity vector from the acceleration vector. The movement vector data De stores therein data (a movement vector) indicative of the moving direction and a moving speed of the player object OBJ, which are set in the virtual game world in accordance with the difference vector.

The correction target data Df includes priority data Df1, correction target position data Df2, guiding source range data Df3, and guiding destination range data Df4 for each of the correction targets TG, and stores therein data indicative of various information about each of the correction targets TG. The priority data Df1 indicates priority for determining whether or not the moving direction of the player object OBJ with respect to each correction target TG is to be corrected. The correction target position data Df2 indicates a position of the correction target TG allocated in the virtual game world. The guiding source range data Df3 indicates the guiding source range set to be centered on the correction target TG. The guiding destination range data Df4 indicates the guiding destination range set to be centered on the correction target TG.

Player object position data Dg stores therein data indicative of a position of the player object OBJ allocated in the virtual game world.

The image data Dh includes player object image data Dh1, correction target image data Dh2, background image data Dh3, and the like. The player object image data Dh1 is used to allocate the player object OBJ in the virtual game world and to generate a game image thereof. The correction target image data Dh2 is used to allocate the correction target TG in the virtual game world and to generate a game image thereof. The background image data Dh3 is used to allocate a background image in the virtual game world and to generate a game image thereof.

Figure 12:
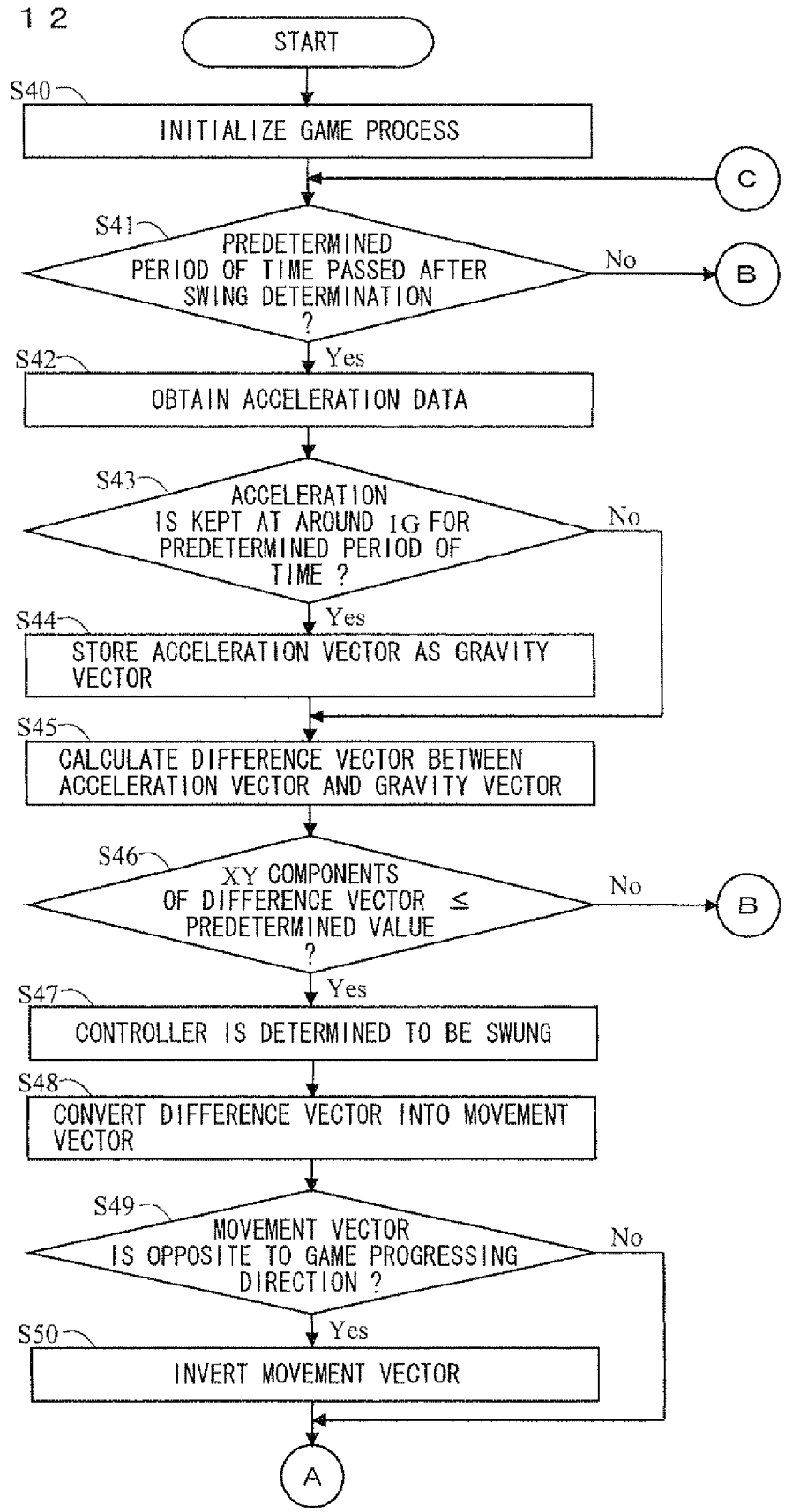
FIG. 12 is a flowchart showing an example of a first half operation of a game process executed on the game apparatus body 5.
Figure 13:
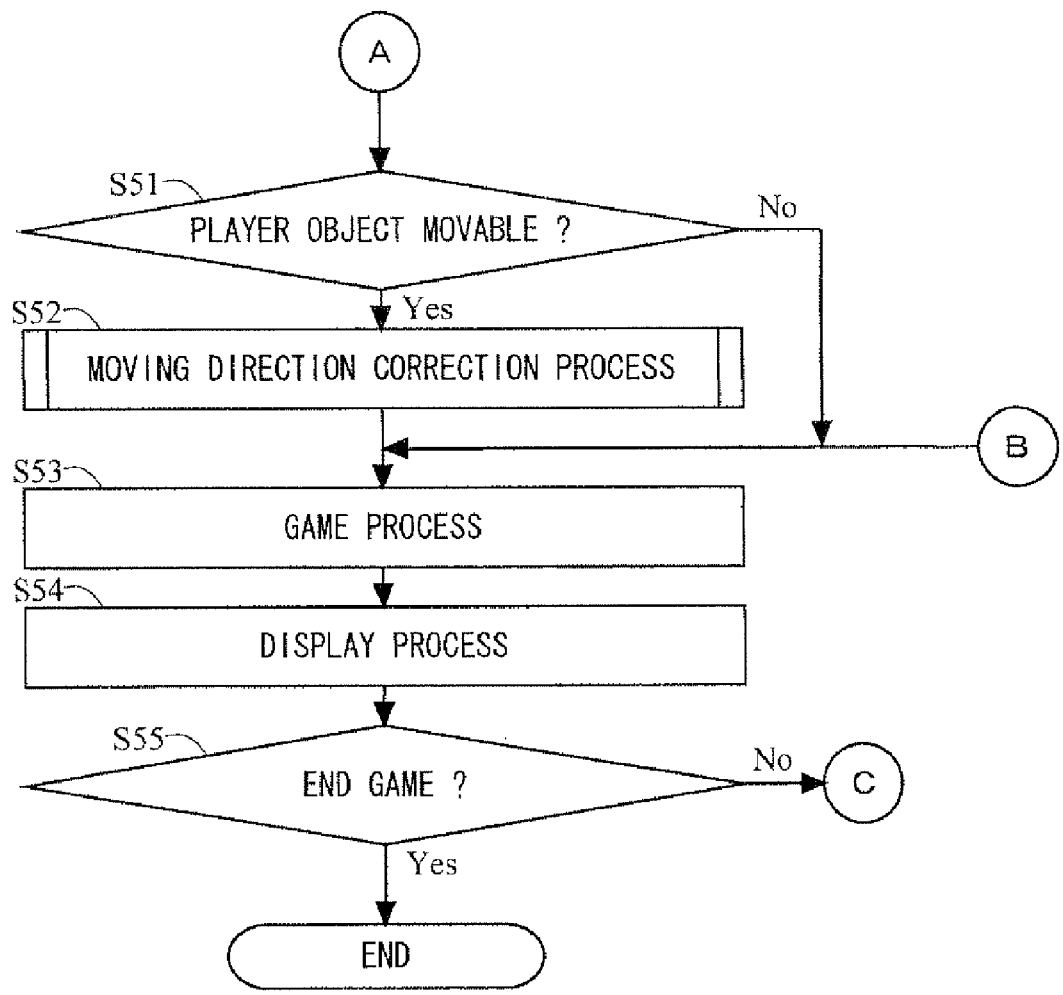
FIG. 13 is a flowchart showing an example of a second half operation of the game process executed on the game apparatus body 5.
Figure 14:
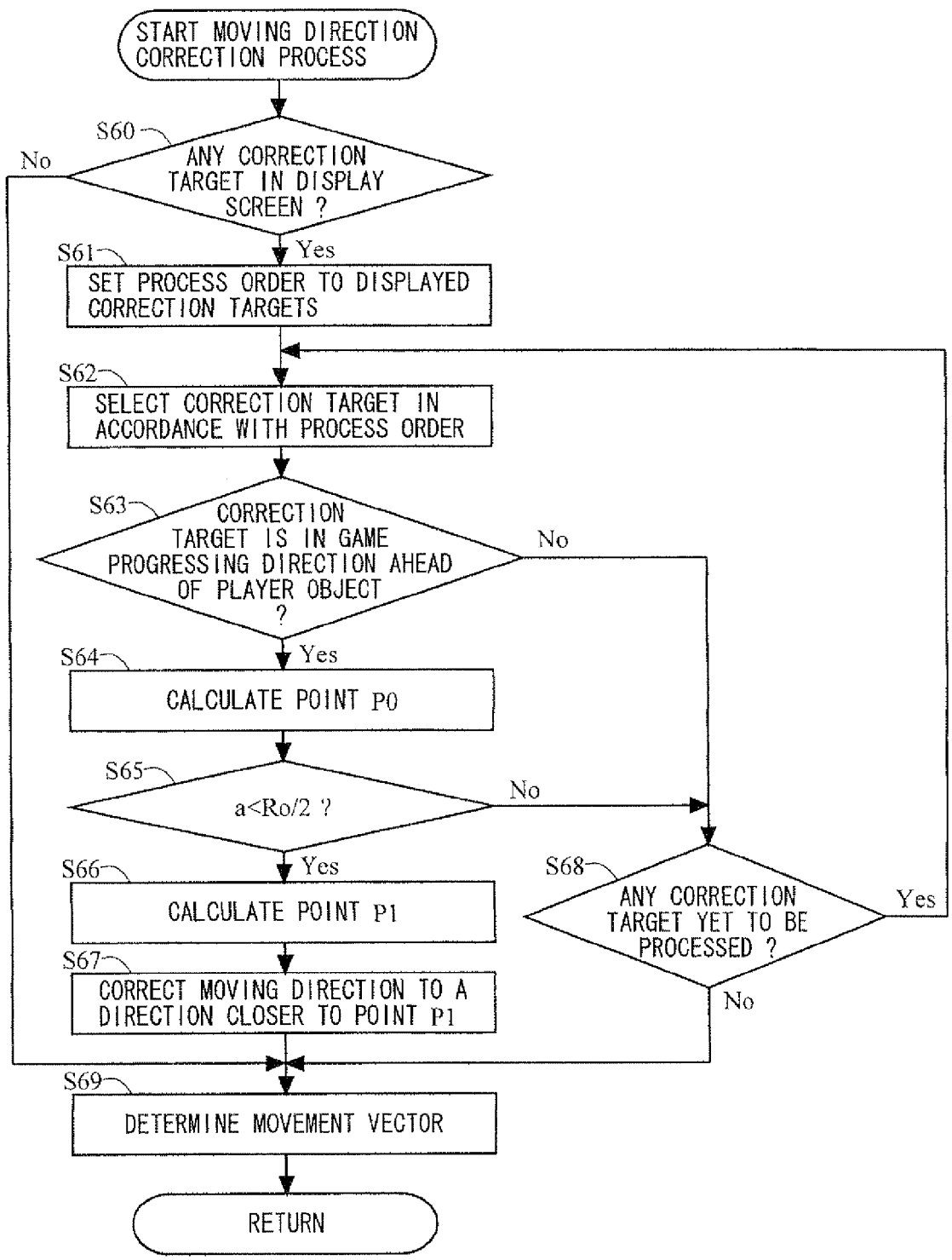
FIG. 14 is a subroutine showing in detail an exemplary moving direction correction process in step 53 shown in FIG. 13.

With reference to FIG. 12 to FIG. 14, the game process performed on the game apparatus body 5 will be described in detail. FIG. 12 is a flowchart showing an example of a first half operation of the game process executed on the game apparatus body 5. FIG. 13 is a flowchart showing an example of a second half operation of the game process executed on the game apparatus body 5. FIG. 14 is a subroutine showing in detail an exemplary moving direction correction process in step 53 shown in FIG. 13. In the flowchart shown in each of FIGS. 12 to 14, the game process particularly relating to a process of causing the player object OBJ to rove in accordance with the controller 7 swung by a player will be mainly described. Description of other processes in the game process, which are not directly related to the prevent invention, will be omitted. Further, in FIGS. 12 to 14, respective steps executed by the CPU 10 are abbreviated as "S".

When the power of the game apparatus body 5 is turned on, the CPU 10 of the game apparatus body 5 executes the boot up program stored in the ROM/RTC 13, thereby initializing respective units such as the main memory. A game program stored in the optical disc 4 is read into the main memory, and the CPU 10 starts executing the game program. The flowchart shown in each of FIGS. 12 to 14 shows a game process to be performed after completion of the above-described process.

In FIG. 12, the CPU 10 initializes the game process (step 40), and advances the process to subsequent step. For example, in initialization of the game process in step 40, setting of the virtual game world, and positions of the player object OBJ, the correction target TG, and other targets than the correction target are initialized. Further, in the initialization of the game process in step 40, respective parameters to be used in the game process performed thereafter are also initialized. For example, the CPU 10 sets respective parameters indicated by respective pieces of data Da to De, which are stored in the main memory, to 0. Further, in the initialization of the game process in step 40, a game progressing direction is set in the virtual game world displayed on the monitor 2 (see FIG. 8). For example, anyone of a left direction, a right direction, an upper direction, and a lower direction of the monitor 2 is set as the game progressing direction. When the left direction is set as the game progressing direction, it may be difficult for such a player that holds the controller 7 with the left hand (a left-handed player) to play the game. Further, when the right direction is set as the game progressing directions it may be difficult for such a player that holds the controller 7 with the right hand (a right-handed player) to play the game. In order to avoid advantage/disadvantage depending on hand dominance, the game progressing direction may be set in accordance with the hand dominance of a player registered in advance.

Next, the CPU 10 determines whether or not elapsed time, after the controller 7 is determined to be swung, reaches predetermined time (step 41). As will be clear later, the CPU 10 determines in step 47 that the controller 7 is swung, and counts the elapsed time after the process in the step. The CPU 10 then determines whether or not the elapsed time reaches predetermined time (e.g., 0.3 sec.). When the elapsed time reaches the predetermined time, the CPU 10 advances the process to step 42 subsequently. On the other hand, when the elapsed time is yet to reach the predetermined time, the CPU 10 advances the process to step 53 subsequently (see FIG. 13).

The process in step 41 is performed to avoid erroneous determination after swinging of the controller 7 is determined. For example, it is highly possible that the acceleration exerted on the controller 7 immediately after the controller 7 is determined to be swung is identical with acceleration in an opposite direction which is applied to stop swinging the controller 7, or identical with acceleration which occurs when a player swings the controller 7 toward a direction opposite to a back swing action, which is performed immediately after the back swing action. That is, during a series of swinging actions, the acceleration in the opposite direction occurs, and if the acceleration including that in the opposite direction is used for swing determination, it becomes difficult to determine the direction in which the controller 7 is actually swung. In the present embodiment, acceleration which occurs for a given period of time (e.g., 0.3 sec.) after the controller 7 is determined to be swung is not used for subsequent swing determination. Accordingly, it is possible to prevent the acceleration in the direction opposite to the acceleration, which is used for a most recent swing determination, from being used for subsequent swing determination.

In step 42, the CPU 10 obtains acceleration data from the controller 7, and advances the process to the subsequent step. For example, the CPU 10 obtains the operation information received from the controller 7, and stores, in the acceleration data Da, acceleration indicated by most recent acceleration data included in the operation information. Specifically, the CPU 10 updates the X-axis direction acceleration data Da1 with the acceleration indicated by the acceleration data along the X-axis direction which is included in the most recent operation information received from the controller 7. Further, the CPU 10 updates the Y-axis direction acceleration data Da2 with the acceleration indicated by the acceleration data along the Y-axis direction which is included in the most recent operation information. Still further, the CPU 10 updates the Z-axis direction acceleration data Da3 with the acceleration indicated by the acceleration data along the Z-axis direction which is included in the most recent operation information.

Next, the CPU 10 calculates the acceleration vector, and determines whether or not magnitude of the acceleration vector is kept at around 1 G ($\approx 9.8$ m/s$^2$) for a given period of time (step 43). For example, the CPU 10 uses the acceleration component along the X-axis direction stored in the X-axis direction acceleration data Da1, the acceleration component along the Y-axis direction stored in the Y-axis direction acceleration data Da2, and the acceleration component along the Z-axis stored in the in the Z-axis direction acceleration data Da3, and then calculates the acceleration vector including the acceleration components in the respective directions. The CPU 10 uses the calculated acceleration vector and updates the acceleration vector data Db. The CPU then determines whether or not the magnitude of the acceleration vector is kept at around 1.0 G (e.g., 1.0 G±10%) for a given period of time (e.g., 0.1 sec.). When the magnitude of the acceleration vector data is kept at around 1 G for the given period of time, the CPU 10 advances the process to step 44 subsequently. On the other hand, when the magnitude of the acceleration vector data is not kept at around 1 G for a given period of time, the CPU 10 advances the process to step 45 subsequently.

In step 44, the CPU 10 sets the acceleration vector at a current time point as the gravity vector, and advances the process to step 45 subsequently. For example, the CPU 10 refers to the acceleration vector data Db, and updates the gravity vector data Dc using the acceleration vector indicated by the acceleration vector data Db. Here, above-described step 44 is executed when the magnitude of the acceleration vector is kept at around 1.0 G for a given period of time. That is, step 44 is executed when the magnitude of the acceleration exerted on the controller 7 is stable at around 1.0 G, and accordingly, it is assumed that the controller 7 is in a static state. Therefore, when the acceleration exerted on the controller 7, which is in a static state, is assumed to be the gravity acceleration. Accordingly, the acceleration vector detected in the above-described state can be regarded as a vector of the gravity acceleration (gravity vector) exerted on the controller 7.

In step 45, the CPU 10 calculates the difference vector by subtracting the gravity vector from the acceleration vector, and advances the process to the subsequent step. For example, with reference to the acceleration vector data Db and the gravity vector data Dc, CPU 10 calculates the difference vector by subtracting the gravity vector indicated by the gravity vector data Dc from the acceleration vector indicated by the acceleration vector data Db, and updates the difference vector data Dd using the difference vector.

Next, the CPU 10 determines whether or not the magnitude of X-axis and Y-axis components of the difference vector, from which the Z-axis component is excluded, is equal to or more than a predetermined value (step 46). The predetermined value is a threshold to determine whether or not the controller 7 is swung by a player, and is set larger than a value of the gravity acceleration (i.e., 1.0 G) exerted on the controller 7 in a static state. Since the Z-axis component of the difference vector will be extremely larger than the other axis (X-axis and Y-axis) components due to a centrifugal force occurring when the controller 7 is swung, whether or not the controller 7 is swung is determined by excluding the Z-axis component in the present embodiment. When the magnitude of the X-axis and Y-axis components of the difference vector is larger than the predetermined value, the CPU 10 advances the process to step 47 subsequently. On the other hand, when the magnitude of the X-axis and Y-axis components of the difference vector is smaller than the predetermined value, the CPU 10 advances the process to step 53 subsequently (see FIG. 13).

In step 47, the CPU 10 determines that the controller 7 is swung and starts counting the elapsed time after the determination. The CPU 10 then advances the process to the subsequent step.

Next, the CPU 10 converts the difference vector at the current time point into a movement vector in the virtual game world (step 48), and advances the process to the subsequent step. For example, the CPU 10 refers to the difference vector data Dd, converts the difference vector indicated by the difference vector data Dd into the movement vector, and updates the movement vector data De using the movement vector. Hereinafter, an exemplary case where the difference vector is converted into the movement vector will be described.

Figure 15A:
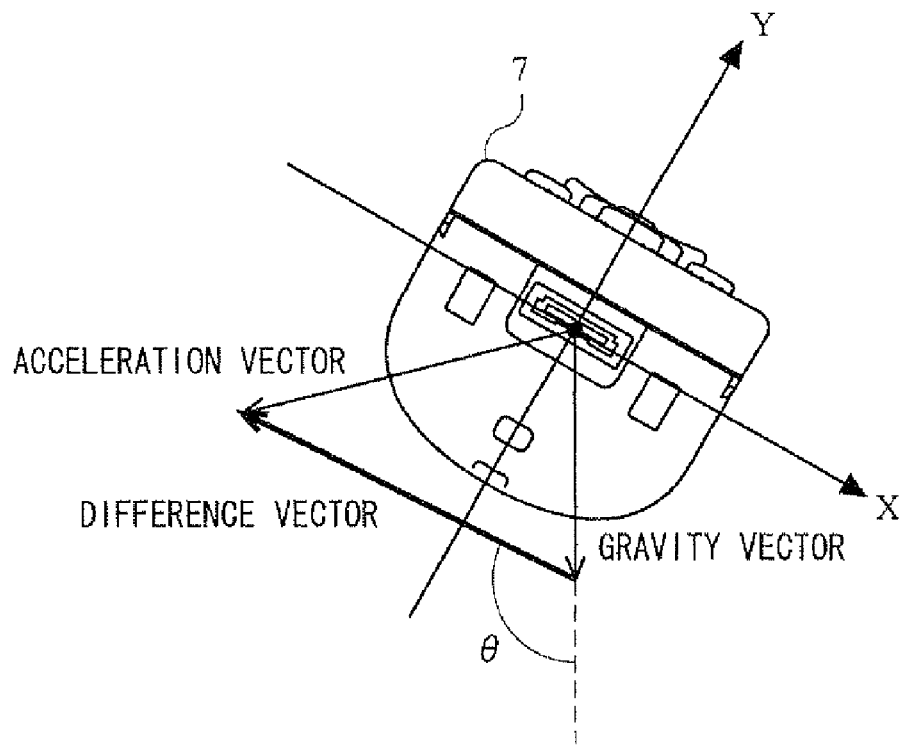
FIG. 15A is a diagram showing an exemplary difference vector calculation.

FIG. 15A is a diagram showing the controller 7 as viewed from the bottom surface thereof. As shown in FIG. 15A, the difference vector is calculated in step 45 by subtracting the gravity vector from the acceleration vector data. As above described, the gravity vector indicates the direction and the magnitude of the gravity acceleration which is exerted on the controller 7 in a static state. On the other hand, the acceleration vector to be detected is a combination between the acceleration generated when the controller 7 is moved (e.g., is swung) and the above-described gravity acceleration. Therefore, the difference vector can be regarded as data indicative of the direction and the magnitude of the acceleration which is generated by a motion of the controller 7.

An angle formed between the direction of the gravity vector and the direction of the difference vector can be used as a parameter indicating a direction of acceleration generated by a motion of the controller 7, the direction being indicated based on the direction of the gravity acceleration. In an exemplary game to be described later, since a two-dimensional virtual game world is applied, the Z-axis component of the gravity vector and the Z-axis component of the difference vector are each set to 0, and an angle θ formed between the direction of the gravity vector and the direction of the difference vector is calculated.

Figure 15B:
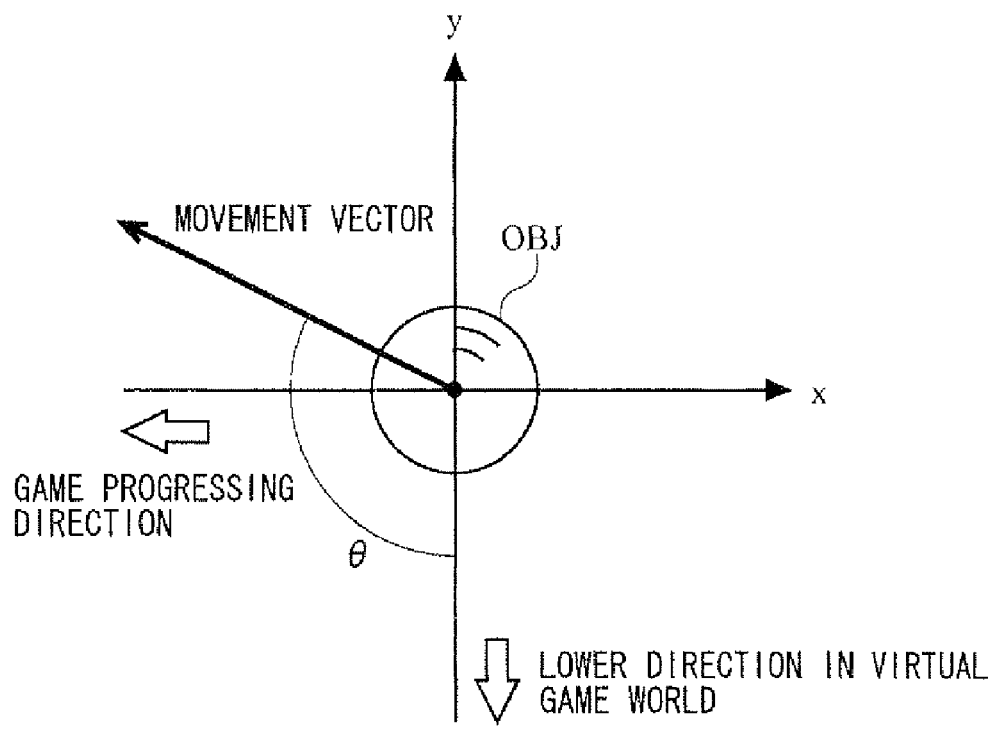
FIG. 15B is a diagram showing an exemplary movement vector calculation.

For example, the two-dimensional virtual game world is displayed on the monitor 2. For the sake of specific description hereinafter, a coordinate system will be defined with respect to the virtual game world. As shown in FIG. 15B, X-axis and Y-axis which are perpendicular to each other are defined on the two-dimensional virtual game world. Specifically, a left-right direction in the virtual game world is defined as the X-axis, and right side in the virtual game world on the monitor 2 is defined as an X-axis positive direction. On the other hand, an up-down direction in the virtual game world is defined as the Y-axis, and the up direction in the virtual game world on the monitor 2 is defined as a Y-axis positive direction.

Went the difference vector is converted into the movement vector, the X-axis component and the Y-axis component of the difference vector are replaced with an X-axis component and a Y-axis component of a vector in the virtual game world, respectively. The movement vector is set in the virtual game world by rotating the direction of the vector in the virtual game world such that an angle formed between the down direction (a Y-axis negative direction) and the movement vector is the angle θ. The magnitude of the movement vector can be adjusted in accordance with operation environments and operational intuition of the game. For example, the magnitude may be adjusted by multiplying the magnitude of the difference vector by a predetermined rate.

With reference back to FIG. 12, the CPU 10 determines whether or not the direction of the movement vector calculated in step 48 is opposite to the game progressing direction (step 49). For example, as shown in FIG. 15B, suppose a case where the game progressing direction is an X-axis negative direction. In this case, the CPU 10 determines that the movement vector is opposite to the game progressing direction when the X-axis component of the movement vector calculated in step 48 is in the X-axis positive direction. When the direction of the movement vector is opposite to the game progressing direction, the CPU 10 advances the process to step 50 subsequently. On the other hand, when the direction of the movement vector corresponds to the game progressing direction, the CPU 10 advances the process to step 51 subsequently (see FIG. 13).

In step 50, the CPU 10 inverts the direction of the movement vector calculated in step 48, and then advances the process to step 51 subsequently. For example, the CPU 10 refers to the movement vector data De, and inverts a positive/negative profile of each of the X-axis component and the Y-axis component of the movement vector indicated by the movement vector data De so as to invert the direction of the movement vector, thereby updating the movement vector data De while using the inverted movement vector. As shown in FIGS. 8 and 9, the present embodiment describes the game in which a player object OBJ is caused to move in the virtual game world in accordance with the direction in which the game controller 7 is swung, and to proceed in the game progressing direction. Therefore, the player does not swing the controller 7 in the direction opposite to the game progressing direction in the virtual game world, and thus when the movement vector opposite to the game progressing direction is obtained, the opposite vector is highly likely to be a back swing operation performed by the player prior to swinging the controller 7. In this case, the controller 7 is swung immediately after the back swing, and the back swing is assumed to be precisely opposite to the swing direction to be performed immediately thereafter. According to the assumption, inversion of the movement vector is performed in the present embodiment. Therefore, in another embodiment, if the player object is movable in any direction, such inversion performed in step 50 is not necessary.

In step 51 (FIG. 13), the CPU 10 determines whether or not the player object OBJ is movable. For example, when the player object OBJ is in a stopped state for the sake of representation effect in the game processing, the CPU 10 determines that the player object OBJ is not in a movable state. When the player object OBJ is in a movable state, the CPU 10 advances the process to step 52 subsequently. On the other hand, when the player object OBJ is not in a movable state, the CPU 10 advances the process to step 53 subsequently.

In step 52, the CPU 10 performs a process for correcting the direction of the movement vector (moving direction), and advances the process to the subsequent step. With reference to FIG. 14, an operation of the moving direction correction process performed in step 52 will be described.

In FIG. 14, the CPU 10 determines whether or not there is any correction target TG in the display on the monitor 2 (step 60). When there is one or more correction targets TG in the display screen, the CPU 10 advances the process to step 61 subsequently. On the other hand, when there is no correction target TG in the display screen, the CPU 10 advances the process to step 69 subsequently.

In step 61, the CPU 10 sets a processing order with respect to the one or more correction targets TG displayed in the display screen, and advances the process to the subsequent step. For example, the CPU 10 extracts a priority level which is indicated by the priority data Df1 and is assigned to each of the correction targets TG displayed in the display screen, and determines the processing order of the correction targets TG in accordance with the priority level. The priority level of the correction targets TG is determined, for example, based on types of the correction targets TG. For example, from the viewpoint of game rules, a more important target than other targets will have a higher priority level, and thus is highly likely to be a target of processing. Alternatively, such a more important target than other target may be given a lower priority level such that the more important target is not likely to be the target of processing.

In step 61, the processing order may be determined in accordance with a distance between the correction target TG and the player object OBJ with reference to the correction target position data Df2 and the player object position data Dg, while being taken the above-described priority level into consideration. For example, when correction targets TG have the same priority level, such a correction target TG that is relatively closer in distance to the player object OBJ is given a priority processing order. In another example, the processing order may be set such that such a correction target TG that is relatively closer in distance to the player object OBJ is given the priority processing order. In this case, when correction targets TG are at the same distance from the player object OBJ, such a correction target TG that has a higher priority level is given the priority processing order.

Next, the CPU 10 selects the correction target TG in order of the processing order (step 62) determined in step 61. The CPU 10 refers to the correction target position data Df2 of the selected correction target TG and the player object position data Dg, and determines whether or not the correction target TG selected in step 62 is in the game progressing direction ahead of the player object OBJ (step 63). When the correction target TG is in the game progressing direction ahead of the player object OBJ, the CPU 10 advances the process to step 64 subsequently. On the other hand, when the correction target TG is not in the game progressing direction ahead of the player object OBJ, the CPU 10 advances the process to step 68 subsequently.

In step 64, the point P0 is calculated with respect to the selected correction target TG. The CPU 10 determines whether or not the distance a between the point P0 and the center of the correction target TG is less than half (Ro/2) of the range length Ro of the guiding source range of the selected correction target TG (step 65). In the case of a<Ro/2, the CPU 10 advances the process to step 66 subsequently. On the other hand, in the case of a≧Ro/2, the CPU 10 advances the process to step 68 subsequently.

As described with reference to FIG. 10A, the point P0 is obtained as an intersection between a direction (straight line L) perpendicular to a direction extending from the player object OBJ toward the correction target TG, and a direction of the movement vector (moving direction). The distance a from the point P0 to the center of the correction target G is compared with the half of the range length Ro of the guiding source range, whereby it is determined whether or not the moving direction, which is currently set and extends from the player object OBJ at a current time point, passes within the guiding source range of the correction target TG. That is, whether or not the selected correction target TG is to be a target of a correction process. In step 64 and step 65, the CPU 10 performs the determination with reference to the movement vector data De, the player object position data Dg, and the correction target position data Df2 and the guiding source range data Df3 of the selected correction target TG.

In step 66, in the case of a<Ro/2, that is, in the case where the selected correction target TG as the target of the correction process, the CPU 10 calculates the point 21 with respect to the correction target TG. The CPU 10 corrects the moving direction so as to be directed to the calculated point P1 (step 67) and then advances the process to the subsequent step.

As described with reference to FIG. 10B, the point P1 is set along the straight line L so as to be distanced from the center of the correction target TG by distance b (=a*Rt/Ro) on the side of the point P0. Accordingly, the moving direction is corrected so as to be closer to the selected correction target TG at a rate of Rt/Ro. In step 66 and step 67, the CPU 10 performs such calculation with reference to the player object position data Dg, and the correction target position data Df2, the guiding source range data Df3 and the guiding destination range data Df4 of the selected correction target TG. The CPU 10 then refers to the movement vector data De, changes the direction of the movement vector indicated by the movement vector data De to the corrected moving direction, and then updates the movement vector data De using the changed movement vector.

On the other hand, in step 68, the CPU 10 determines whether or not there is any correction targets TG yet to be processed, among the correction targets TG with respect to which the processing order is set in step 61. When there is no correction target TG yet to be processed, the CPU 10 advances the process to step 69 subsequently. On the other hand, when there is any correction target TG yet to be processed, the CPU 10 returns to step 62, and repeats the process.

In step 69, the CPU 10 determines the movement vector indicated by the movement vector data De at the current time point as the movement vector to be used in the game process thereafter, and terminates the process of the subroutine.

With reference back to FIG. 13, after the moving direction correction process in step 52, the CPU 10 performs the game process (step 53), performs a display process to display, on the monitor 2, a game image corresponding to the game process (step 54), and advances the process to the subsequent step. For example, in step 53, the CPU 10 causes the player object OBJ in the virtual game world to move in accordance with the movement vector indicated by the movement vector data De. When the player object OBJ has contact with another object or the like in the virtual game world, the CPU 10 performs a process in response to the object (e.g., a process to destroy the object, or a process to cause the player object OBJ to bounce off the object). Further, the CPU 10 also performs other game process that is not related to movement of the player object OBJ.

The movement vector indicated by the movement vector data De may be changed in accordance with details of the game process after the game process in step 53. For example, after the game process in step 53, the movement vector may be reduced at a predetermined rate. Alternatively, the direction of the movement vector may be changed when the player object OBJ has contact with another object in accordance with the above-described game process. When the movement vector is changed after the game process in step 53, the CPU 10 updates the movement vector data De using the changed movement vector.

Next, the CPU 10 determines whether or not to terminate the game (step 55). The game may be terminated, for example, when a condition for game over is satisfied, or when the player performs an operation to terminate the game. When the game is not terminated, the CPU 10 returns to step 41 (see FIG. 12) and repeats the process, whereas when the game is to be terminated, the process in the flowchart is terminated.

According to the above-described game process, with respect to the player object OBJ moving in accordance with the direction in which the controller 7 is swung, the moving direction of the player object OBJ is corrected so as to be closer to the correction target TG. Therefore, when the player desires to cause the player object OBJ to hit the correction target TG in the virtual game world, the hit can be achieved even it the direction from the player object OBJ to the correction target TG is not absolutely identical with the swing direction of the controller 7. That is, when the player swings the controller 7 in a direction closer, to some extent, to the direction extending from the player object OBJ toward the correction target TG, the player's desired operation can be achieved. That is, an accurate operation is not required.

On the other hand, in the case where setting is made such that the player object OBJ definitely hits the correction target TG when the player swings the controller 7, the game loses the sense of subtlety and does not provide the player with amusingness. In the above-described game process, the sizes of the guiding source range and the guiding destination range of the correction target TG are adjusted, whereby a degree of correction used for correcting the moving direction is determined. That is, when there is a great difference between the direction extending from the player object OBJ to the correction target TG and the swing direction of the controller 7, it is possible to adjust the moving direction such that the player object OBJ does not hit the correction target TG. In this case, the player needs to swing the controller deliberately to some extent such that the player object OBJ hits the correction target TG. Specifically, the size of the guiding destination range with respect to the size of the correction target TG is adjusted, whereby the above-described degree of correction is determined. Further, by adjusting the size of the guiding source range, it is possible to adjust the possibility that the correction target TG is to be a target of the correction process. In this manner, in the above-described game process, the size of the guiding destination range (range length Rt) and/or the size (range length Ro) of the guiding source range are/is changed, whereby it is possible to adjust difficulty levels of various games.

Figure 16A:
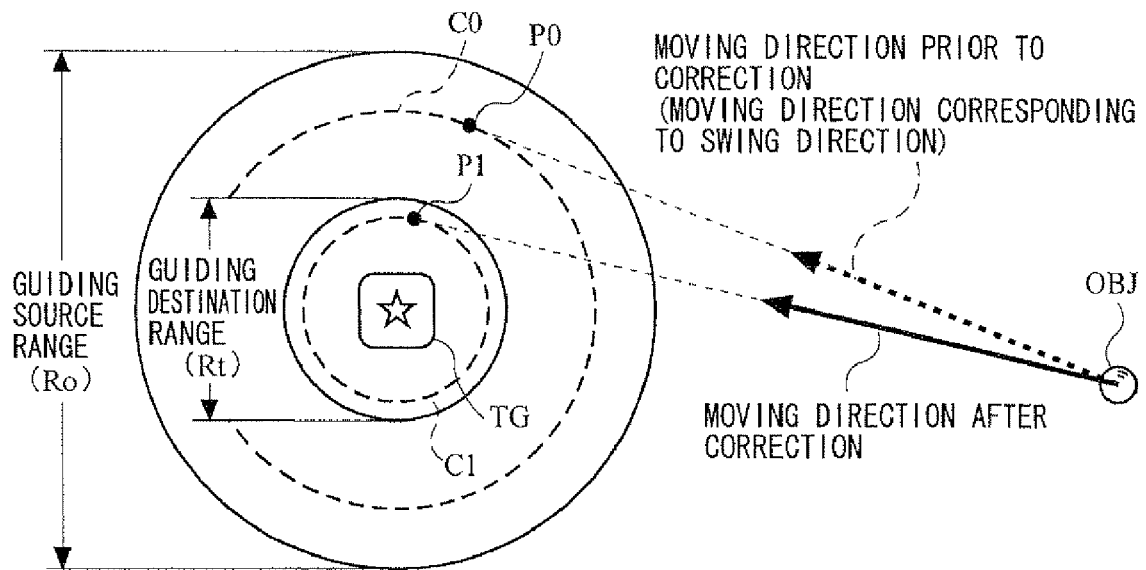
FIG. 16A is a diagram showing another example in which the moving direction set based on the swinging motion of the controller 7 is corrected.
Figure 16B:
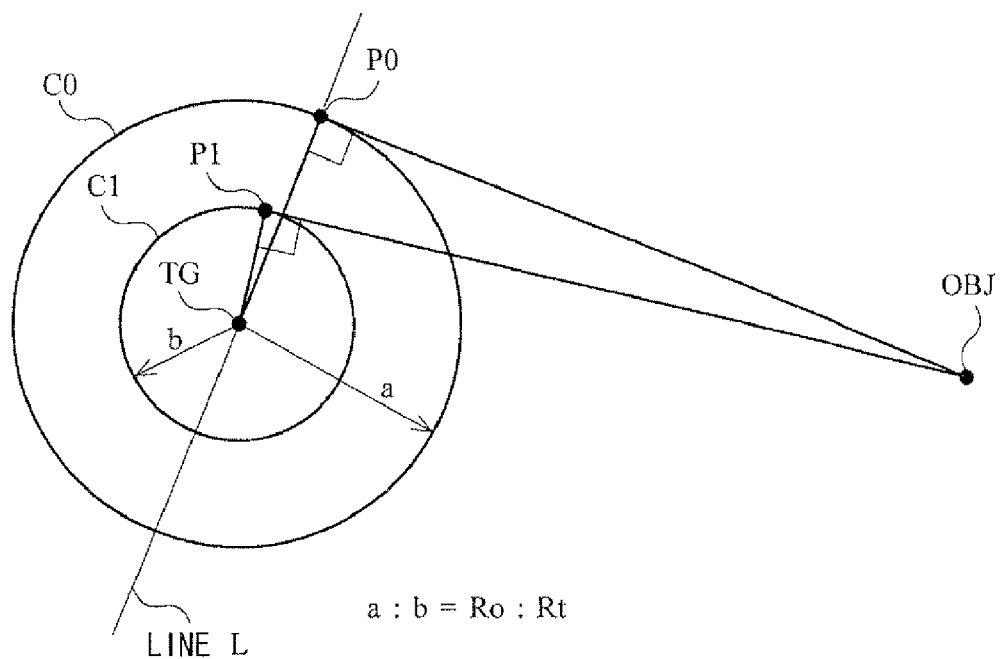
FIG. 16B is a diagram showing another example in which the moving direction set based on the swinging motion of the controller 7 is corrected.

The guiding source range and the guiding destination range of the correction target TG may be set in other forms. Hereinafter, with reference to FIGS. 16A and 16B, an example will be described where the guiding source range and the guiding destination range are set in other forms. FIGS. 16A and 16B are diagrams each showing an exemplary guiding source range and an exemplary guiding destination range of a correction target TG, which are circular-shaped.

In FIG. 16A and FIG. 16B, the circular-shaped guiding source range and the circular-shaped guiding destination range are set with respect to the correction target TG. The guiding source range is a circle centered on the correction target TG and has a diameter Ro. By using the guiding source range, whether or not a moving direction of a player object OBJ is to be corrected is determined. The moving direction is set in the virtual game world in accordance with the direction in which the controller 7 is swung. Specifically, when the set moving direction extends from a position of the player object OBJ at a current time point and passes through at least a part off the guiding source range, the correction target TG which defines the guiding source range is set as a target of the correction process.

The guiding destination range is a circle centered on the correction target TG and has a diameter Rt (Rt<Ro). The guiding destination range is used to determine a degree of correction of the moving direction of the player object OBJ so as to be closer to the correction target TG. For example, the moving direction, which is set as a target of the correction process, is corrected so as to be closer to the correction target TG in accordance with a ratio of a diameter of the guiding destination range to a diameter of the guiding source range.

Specifically, a circle C0 is set which is centered on the correction target TG and is tangent to the moving direction prior to correction. A radius of the circle C0 is defined as a radius a (a<Ro/2). A contact point between the moving direction prior to correction and the circle C0 is P0. In this case, in accordance with the radius a, a circle C1 is set, which is centered on the correction target TG and has a radius b. The radius b is calculated based on an equation, b=a*Rt/Ro. The moving direction prior to correction which extends from the position of the player object OBJ at the current time point and is tangent to the circle C0 is corrected so as to extend from the position of the player object OBJ at the current time point toward a direction tangent to the circle C1. When the contact point between the moving direction after correction and the circle C1 is defined as P1, the contact point P1 is set on the side of the contact point P0 from the correction target TG.

The guiding source range and/or the guiding destination range may be changed in accordance with a game situation. As a first example, the size of the guiding source range and/or the guiding destination range is changed in accordance with the position of the correction target TG relative to the display screen on the monitor 2. For example, when the correction target TG is scrolled in a direction opposite to the game progressing direction, the guiding source range of the correction target TG is gradually enlarged in accordance with the scrolling movement. Accordingly, when the correction target TG is located on an upper side or a lower side of the player object OBJ, and is not easily hit by the player object OBJ, it will be less difficult to guide the player object OBJ to the correction target TG.

As a second example, the size of the guiding source range and/or the guiding destination range is changed with time. For example, the guiding destination range of the correction target TG is gradually reduced. In this manner, the guiding destination range of the correction target TG is changed, whereby the player object OBJ, which cannot easily hit the correction target TG at the start of the game, comes to easily hit the correction target TG with time.

As a third example, the size of the guiding source range and/or the guiding destination range is changed in accordance with a game difficulty level. For example, in the case of a skilled game player or a game stage of a highly difficult level, the guiding source range is reduced relatively, or the guiding destination range is enlarged relatively. Accordingly, in the case of the skilled game player or the game state of the highly difficult level, it is possible to create a situation where the player object OBJ cannot easily hit the correction target TG.

Further, based on an amount of correction made with respect to a moving direction of a movement vector, a game skill of a player may be determined. Namely, a difference between a movement vector prior to correction and a movement vector after correction is calculated so as to determine the game skill of the player. For example, a difference between the distance a and the distance b, which have been described with reference to FIG. 10B, is calculated during a game. The greater the average value of the difference is, the lower the game skill of the player operation ability) is determined to be. Alternatively, an average value of a difference between the radius a and the radius b, which have been described with reference to FIG. 16B, may be calculated. The greater the average value is, the lower the game skill of the player is determined to be.

In the above-described game process, the acceleration data indicative of acceleration in three axis directions obtained from the acceleration sensor 701 is used. However, acceleration data indicative of acceleration in two axis directions may be used, alternatively. In this case, it is impossible to analyze acceleration occurs in a direction perpendicular to the two axis directions (e.g., the Z-axis direction). However, since the acceleration in a direction in which the centrifugal force is exerted during the game process is eliminated, it is possible to perform a similar process even if the acceleration data of the acceleration in the two axis directions (e.g., the X-axis direction and the Y-axis direction) only is used.

The above-described game is such that the player object OBJ in the two-dimensional virtual game world moves to the right and left in accordance with the direction in which the controller 7 is swung. However, it is understood that the present invention can be applied to a game in another form. As a first example, the present invention may be applied to a game in which a player object moves up and down in a two dimensional virtual game world in which a correction target is allocated. In this case, when a player swings the controller 7 up and down, the player object moves up and down in the virtual game world, whereby the moving direction of the player object is corrected based on a correction target allocated therein.

As a second example, the present invention may be applicable to a game in which a player object moves in a depth direction of a virtual game world which is displayed on the monitor 2 and which has a correction target allocated therein. In this case, a player holds the controller 7 and moves the controller 7 as if the player gives a thrust. With acceleration occurred in accordance with the thrusting behaviors a player object is caused to move in the depth direction, and a moving direction of the player object is corrected in accordance with the correction target allocated in the virtual game world.

As a third example, the present invention may be applicable to a game in which a player object is caused to move in a three-dimensional virtual game space in accordance with the controller 7 moving up and down, right and left, or back and forth. In this case, the acceleration in the Z-axis direction which is applied to the controller 7 is not eliminated from the acceleration indicated by the acceleration data in the three axis directions which is obtained from the acceleration sensor 701, but the acceleration in all the three axis directions is used, and the direction and the magnitude of the acceleration is reflected in the three-dimensional virtual game space. Accordingly, the moving direction of the player object is corrected in accordance with the correction target allocated in the space.

In the above description, the movement of the controller 7 is detected by using the acceleration indicated by the acceleration data in the three axis directions obtained from the acceleration sensor 701. However, the movement of the controller 7 may be detected by using date outputted from a sensor of another type mounted in the controller 7. For example, a sensor (an acceleration sensor, a tilt sensor) which outputs data corresponding to a tilt of the controller 7 relative to the direction of gravity (hereinafter simply referred to as "tilt"), a sensor (a magnetic sensor) which outputs data corresponding to an azimuth orientation of the controller 7, or a sensor (a gyro sensor) which outputs data corresponding to rotational movement of the controller 7 may be applicable. Further, the acceleration sensor and the gyro sensor is not necessarily multi-axis detectable, but may be single-axis detectable. Further, some of the sensors may be combined to perform a further accurate detection. Alternatively, a camera mounted in the controller 7 (e.g., the imaging information calculation section 74) may be used as the sensor. In this case, an image captured by the camera changes in accordance with movement of controller 7, and thus it is possible to determine the movement of the controller 7 by analyzing the image.

The sensor may be, in some cases, arranged independently of the controller 7. For example, an entirety of the controller 7 is captured by the sensor, which is situated outside the controller 7 and is used as a camera, and an image of the controller 7 in the captured image is analyzed, whereby it is possible to determine the movement of the controller 7. Further, a system may be applicable in which a unit mounted in the controller 7 and a unit arranged independently of the controller 7 are used in a combined manner. For example, a light emitting unit is arranged independently of the controller 7, and a camera mounted in the controller 7 captures light from the light emitting unit. The image captured by the camera is analyzed, whereby it is possible to determine the movement of the controller 7. Alternatively, a system may be used in which a magnetic field generation device is arranged independently of the controller 7, and a magnetic sensor is mounted in the controller 7.

In the above description, a case has been exemplified where a stationary game apparatus is applied to the present invention. However, the present invention can be realized with an information processing device such as a commonly used personal computer, which is operated with an input device including the acceleration sensor. In this case as well, various game processes can be performed based on the acceleration exerted on the input device. For example, in accordance with the acceleration data outputted from the acceleration sensor in the input device, the information processing device can calculate a direction in which the input device held by a user is swung.

The case has been described above where the controller 7 and the game apparatus body 5 are connected via wireless communication. However, the controller 7 may be electrically connected to the game apparatus body 5 via a cable. In this case, the cable connected to the controller 7 is connected to a connection terminal of the game apparatus body 5.

Further, the shape of the above-described controller 7, and the shapes, numbers, and installed positions of the operation sections 72 are merely examples, and the present invention can be realized with other shapes, numbers and installed positions. Further, the coefficients, determination values, equations, processing orders or the like used in the above-described processing are merely example, and the present invention can be realized with other values, equations, or processing orders.

The game program according to the present embodiment may be provided to the game apparatus body 5 not only through an external storage medium such as the optical disc 4, but also through a wired or a wireless communication line. Further, the game program may be stored in advance on a non-volatile storage device provided inside the game apparatus body 5. As an information storage medium storing the game program, a non-volatile semiconductor memory may be used instead of an optical disc-shaped storage medium including a CD-ROM, a DVD, and the like.

The game apparatus and the storage medium having stored thereon the game program according to the present embodiment are capable of appropriately set a direction in which an input device is swung, and may be useful as a game apparatus and a game program for executing a game which progresses in accordance with an operation of swinging the input device.

While the embodiment presented herein has been described in detail, the foregoing description is in all aspects illustrative and not restrictive. It is understood that numerous other modifications and variations can be devised without departing from the scope of the embodiment.

What is claimed is:

1. A game apparatus performing a computer implemented game process in accordance with a motion applied to an input device, comprising:
    a motion direction identifying unit for identifying a motion direction of the input device;
    a moving direction setting unit for setting a moving direction of a player object in a virtual game world in accordance with the motion direction of the input device;
    a correction unit for correcting, via at least one computer processing device, the moving direction set by the moving direction setting unit in accordance with a positional relation between the player object and a target object, which is other than the player object, in the virtual game world; and
    a movement control unit for causing the player object to move in the virtual game world in accordance with the moving direction.

2. The game apparatus according to claim 1, wherein
    the correction unit corrects the moving direction set by the moving direction setting unit such that the moving direction becomes closer to a direction which extends from the player object toward the target object in the virtual game world.

3. The game apparatus according to claim 2, further comprising:
    a guiding destination range setting unit for setting a guiding destination range, which is larger in size than the target object and set with respect to the target object, in the virtual game world, wherein
    the correction unit corrects the moving direction set by the moving direction setting unit such that the player object in the virtual game world passes through a guiding destination range of the target object.

4. The game apparatus according to claim 3, further comprising:
    a guiding source range setting unit for setting a guiding source range, which is set with respect to the target object and is larger in size than the guiding destination range, in the virtual game world, wherein
    in the case where the moving direction set by the moving direction setting unit extends from the player object and passes within the guiding source range, the correction unit corrects the moving direction such that the player object passes within the guiding destination range of the target object which defines the guiding source range.

5. The game apparatus according to claim 4, wherein
    the correction unit corrects the moving direction set by the moving direction setting unit such that the moving direction becomes closer to a direction which extends from the player object toward the target object, in accordance with a ratio of a magnitude of the guiding destination range to a magnitude of the guiding source range.

6. The game apparatus according to claim 5, further comprising
    a skill calculation unit for calculating an operation ability of a player operating the player object, in accordance with an amount of correction made by the correction unit so as to cause the moving direction set by the moving direction setting unit to be closer to a direction which extends from the player object toward the target object.

7. The game apparatus according to claim 4, wherein
    the guiding destination range setting unit sets, as the guiding destination range, a predetermined range that is along a vertical line, which is perpendicular to a line connecting between the player object and the target object and runs through the target object, and that is centered on the target object;
    the guiding source range setting unit sets, as the guiding source range, a range that is along the vertical line and that is larger than the guiding destination range centered on the target object; and
    in the case where the moving direction, which extends from the player object, intersects with the guiding source range, the correction unit corrects the moving direction so as to intersect with the guiding destination range of the target object which defines the guiding source range.

8. The game apparatus according to claim 4, wherein
    the guiding destination range setting unit sets, as the guiding destination range, a circle which is centered on the target object and has a predetermined radius;
    the guiding source range setting unit sets, as the guiding source range, a circle which is centered on the target object and has a radius larger than that of the guiding destination range; and
    in the case where the moving direction, which extends from the player object, passes within the guiding source range, the correction unit corrects the moving direction such that the moving direction is tangent to a circle that has a radius smaller than the radius of the guiding destination range of the target object which defines the guiding source range and that is centered on the target object.

9. The game apparatus according to claim 3, wherein
    the guiding destination range setting unit gradually reduces a magnitude of the guiding destination range with time.

10. The game apparatus according to claim 1, wherein
    the correction unit compares the moving direction set by the moving direction setting unit with a direction in which the player object in the virtual game world moves toward the target object, and corrects the moving direction in the case where both of the directions are closer to each other than a predetermined reference.

11. The game apparatus according to claim 10, further comprising:
a guiding source range setting unit for setting a guiding source range, which is set with respect to the target object and is larger in size than the target object, in the virtual game world, wherein
the correction unit corrects the moving direction set by the moving direction setting unit in the case where the moving direction extends from the player object and passes within the guiding source range.

12. The game apparatus according to claim 11, further comprising:
a display control unit for allocating the player object and the target object in the virtual game world, and for displaying at least a part of the virtual game world on a display, wherein
the guiding source range setting unit changes a magnitude of the guiding source range in accordance with a position of the target object displayed on the display.

13. The game apparatus according to claim 10, further comprising:
a display control unit for allocating the player object and a plurality of the target objects in the virtual game world, and for displaying at least a part of the virtual game world on a display; and
a priority setting unit for setting a priority of correction in advance with respect to the target objects, wherein
in the case where there are a plurality of the target objects in a display screen displayed by the display, the correction unit compares directions in which the player object in the virtual game world moves toward the target objects with the moving direction set by the moving direction setting unit in order of the priority set with respect to the target objects, and corrects the moving direction by using one of the target objects whose direction is first found to be closer to the moving direction than the predetermined reference.

14. The game apparatus according to claim 1, wherein
the input device includes an acceleration sensor; and
the motion direction identifying unit identifies the motion direction of the input device by using acceleration indicated by acceleration data outputted from the acceleration sensor.

15. The game apparatus according to claim 14, wherein
the motion direction identifying unit includes:
a gravity direction identifying unit for identifying a direction of acceleration as a direction of gravity applied to the input device, in the case where a change in the acceleration indicated by the acceleration data shows that a magnitude of the acceleration is kept equivalent to a magnitude of gravity acceleration for a predetermined period of time; and
a motion calculation unit for identifying the motion direction of the input device in accordance with the acceleration which is calculated by eliminating an acceleration component in the direction of gravity from the acceleration indicated by the acceleration data.

16. The game apparatus according to claim 14, wherein
the motion direction identifying unit performs a process for identifying a subsequent motion direction of the input device after a predetermined period of time passes from a time point at which the motion direction of the input device has been identified.

17. A non-transitory computer-readable storage medium having stored thereon a game program executed on a computer of a game apparatus including one or more computer processors, to perform, in accordance with a motion applied to an input device:
identify a motion direction of the input device;
set a moving direction of a player object in a virtual game world in accordance with the motion direction of the input device;
correct the set moving direction in accordance with a positional relation between the player object and a target object, which is other than the player object, in the virtual game world; and
control movement for causing the player object to move in the virtual game world in accordance with the moving direction.

18. The non-transitory computer-readable storage medium having stored thereon the game program according to claim 17, wherein
the set moving direction is corrected such that the moving direction becomes closer to a direction which extends from the player object toward the target object in the virtual game world.

19. The non-transitory computer-readable storage medium having stored thereon the game program according to claim 18, further causing the computer to:
set a guiding destination range, which is larger in size than the target object and is set with respect to the target object, in the virtual game world, wherein
the set moving direction is corrected such that the player object in the virtual game world passes through a guiding destination range of the target object.

20. The non-transitory computer-readable storage medium having stored thereon the game program according to claim 19, further causing the computer to:
set a guiding source range, which is set with respect to the target object and is larger in size than the guiding destination range, in the virtual game world, wherein
in the case where the set moving direction extends from the player object and passes within the guiding source range, the moving direction is corrected such that the player object passes within the guiding destination range of the target object which defines the guiding source range.

21. The non-transitory computer-readable storage medium having stored thereon the game program according to claim 20, wherein
the set moving direction is corrected such that the moving direction becomes closer to a direction which extends from the player object toward the target object, in accordance with a ratio of a magnitude of the guiding destination range to a magnitude of the guiding source range.

22. The non-transitory computer-readable storage medium having stored thereon the game program according to claim 21, further causing the computer to:
calculate an operation ability of a player operating the player object, in accordance with an amount of correction made so as to cause the set moving direction to be closer to a direction which extends from the player object toward the target object.

23. The non-transitory computer-readable storage medium having stored thereon the game program according to claim 20, wherein
a predetermined range that is along a vertical line, which is perpendicular to a line connecting between the player object and the target object and runs through the target object, and that is centered on the target object is set as the guiding destination range;
a range that is along the vertical line and that is larger than the guiding destination range centered on the target object is set as the guiding source range; and
in the case where the moving direction, which extends from the player object, intersects with the guiding source range, the moving direction is corrected so as to intersect with the guiding destination range of the target object which is defines the guiding source range.

24. The non-transitory computer-readable storage medium having stored thereon the game program according to claim 20, wherein
a circle which is centered on the target object and has a predetermined radius is set as the guiding destination range;
a circle which is centered on the target object and has a radius larger than that of the guiding destination range is set as the guiding source range; and
in the case where the moving direction, which extends from the player object, passes within the guiding source range, the moving direction is corrected such that the moving direction is tangent to a circle that has a radius smaller than the radius of the guiding destination range of the target object which defines of the guiding source range and that is centered on the target object.

25. The non-transitory computer-readable storage medium having stored thereon the game program according to claim 19, wherein
a magnitude of the guiding destination range is gradually reduced with time.

26. The non-transitory computer-readable storage medium having stored thereon the game program according to claim 17, wherein
the set moving direction is compared with a direction in which the player object in the virtual game world moves toward the target object, and the moving direction is corrected in the case where both of the directions are closer to each other than a predetermined reference.

27. The non-transitory computer-readable storage medium having stored thereon the game program according to claim 26, further causing the computer to:
set a guiding source range, which is set with respect to the target object and is larger in size than the target object, in the virtual game world, wherein
the set moving direction is corrected in the case where the moving direction extends from the player object and passes within the guiding source range.

28. The non-transitory computer-readable storage medium having stored thereon the game program according to claim 27, further causing the computer to:
control display for allocating the player object and the target object in the virtual game world, and for displaying at least a part of the virtual game world on a display, wherein
a magnitude of the guiding source range is changed in accordance with a position of the target object displayed on the display.

29. The non-transitory computer-readable storage medium having stored thereon the game program according to claim 26, further causing the computer to:
control display for allocating the player object and a plurality of the target objects in the virtual game world, and for displaying at least a part of the virtual game world on a display; and
set a priority of correction in advance with respect to the target objects, wherein
in the case where there are a plurality of the target objects in a display screen displayed by the display, the directions in which the player object in the virtual game world moves toward the target objects are compared with the set moving direction in order of the priority set with respect to the target objects, and the moving direction is corrected by using one of the target objects whose direction is first found to be closer to the moving direction than the predetermined reference.

30. The non-transitory computer-readable storage medium having stored thereon the game program according to claim 17, wherein
the input device includes an acceleration sensor; and
the motion direction of the input device is identified by using acceleration indicated by acceleration data outputted from the acceleration sensor.

31. The non-transitory computer-readable storage medium having stored thereon the game program according to claim 30, further causing the computer to:
identify a direction of acceleration as a direction of gravity applied to the input device, in the case where a change in the acceleration indicated by the acceleration data shows that a magnitude of the acceleration is kept equivalent to a magnitude of gravity acceleration for a predetermined period of time; and
identify the motion direction of the input device in accordance with the acceleration which is calculated by eliminating an acceleration component in the direction of gravity from the acceleration indicated by the acceleration data.

32. The non-transitory computer-readable storage medium having stored thereon the game program according to claim 30, wherein
a process is performed for identifying a subsequent motion direction of the input device after a predetermined period of time passes from a time point at which the motion direction of the input device has been identified.

* * * * *